(12) United States Patent
Wiedmeyer et al.

(10) Patent No.: US 10,943,291 B2
(45) Date of Patent: Mar. 9, 2021

(54) VIRTUAL REALITY PLATFORM FOR RETAIL ENVIRONMENT SIMULATION

(71) Applicant: InContext Solutions, Inc., Chicago, IL (US)

(72) Inventors: Tracey Wiedmeyer, Chicago, IL (US); Matt Knowles, Chicago, IL (US); Alan Reck, Chicago, IL (US); August Wasilowski, Chicago, IL (US); Brian Jensen, Chicago, IL (US); Filad Shehu, Chicago, IL (US); Gregory Michael Caputo, Jr., Chicago, IL (US)

(73) Assignee: InContext Solutions, Inc., Chicago, IL (US)

( * ) Notice: Subject to any disclaimer, the term of this patent is extended or adjusted under 35 U.S.C. 154(b) by 207 days.

(21) Appl. No.: 16/091,035

(22) PCT Filed: Apr. 3, 2017

(86) PCT No.: PCT/US2017/025787
§ 371 (c)(1),
(2) Date: Oct. 3, 2018

(87) PCT Pub. No.: WO2017/173457
PCT Pub. Date: Oct. 5, 2017

(65) Prior Publication Data
US 2019/0251622 A1 Aug. 15, 2019

Related U.S. Application Data

(60) Provisional application No. 62/319,243, filed on Apr. 6, 2016, provisional application No. 62/319,186, filed
(Continued)

(51) Int. Cl.
*G06Q 30/00* (2012.01)
*G06Q 30/06* (2012.01)

(52) U.S. Cl.
CPC ..... *G06Q 30/0643* (2013.01); *G06Q 30/0623* (2013.01); *G06Q 30/0631* (2013.01)

(58) Field of Classification Search
CPC ............... G06Q 30/00; G06Q 30/0601; G06Q 30/0623; G06Q 30/0631; G06Q 30/0641
See application file for complete search history.

(56) References Cited

U.S. PATENT DOCUMENTS

2003/0158796 A1* 8/2003 Balent .................. G06Q 10/087
705/28
2008/0226119 A1* 9/2008 Candelore ............... G06F 16/58
382/100
(Continued)

OTHER PUBLICATIONS

Papagiannidis, Sawas, et al. "To immerse or not? Experimenting with two virtual retail environments." Information Technology & People (2017). (Year: 2017).*
(Continued)

*Primary Examiner* — Christopher B Seibert
(74) *Attorney, Agent, or Firm* — Locke Lord LLP; Christopher J. Capelli

(57) ABSTRACT

Systems and methods are provided for generating a virtual reality (VR) simulation of a retail store, which simulation is configured and displayed on an immersive VR display device that enables a user to experience the simulated retail store as if it were a physical retail store. The systems enable the user to arrange display cases and other interior store components, and to populate shelves, racks, and the like, with products to be sold in the retail store. A VR platform enables multiple users to synchronously view the VR simulation and make coordinated changes to develop an optimized configuration of the retail store. Marketing, sales, merchant, and other data may be collected, aggregated, and analyzed to identify purchase trends of certain products; the analyzed data may identify user shopping preferences, and
(Continued)

the VR platform may generate a customized retail store including only products relevant to a user.

13 Claims, 17 Drawing Sheets

Related U.S. Application Data on Apr. 6, 2016, provisional application No. 62/317,199, filed on Apr. 1, 2016.

(56) References Cited

U.S. PATENT DOCUMENTS

| | | | |
|---|---|---|---|
| 2008/0262910 A1 | 10/2008 | Altberg et al. | |
| 2008/0279481 A1* | 11/2008 | Ando | G06F 16/951 382/306 |
| 2009/0063307 A1* | 3/2009 | Groenovelt | G06Q 10/087 705/28 |
| 2009/0128335 A1* | 5/2009 | Leung | G06Q 30/0601 340/572.1 |
| 2010/0046842 A1* | 2/2010 | Conwell | G06K 9/32 382/218 |
| 2010/0083169 A1 | 4/2010 | Athsani et al. | |
| 2010/0306120 A1* | 12/2010 | Ciptawilangga | G06Q 30/00 705/319 |
| 2011/0221657 A1* | 9/2011 | Haddick | G06F 1/1673 345/8 |
| 2012/0290366 A1* | 11/2012 | Giles | G06Q 40/02 705/14.1 |
| 2013/0073387 A1 | 3/2013 | Heath | |
| 2013/0179303 A1* | 7/2013 | Petrou | G06Q 30/0623 705/26.61 |
| 2014/0028712 A1* | 1/2014 | Keating | G06T 7/246 345/633 |
| 2014/0052550 A1* | 2/2014 | Glazer | G06Q 30/0617 705/14.73 |
| 2014/0100996 A1* | 4/2014 | Klein | G06T 1/00 705/27.2 |
| 2014/0100997 A1* | 4/2014 | Mayerle | G06Q 30/0276 705/27.2 |
| 2014/0143105 A1* | 5/2014 | Shaw | G06Q 10/06311 705/30 |
| 2014/0152847 A1* | 6/2014 | Zomet | G06Q 30/0629 348/207.1 |
| 2014/0324627 A1 | 10/2014 | Haver et al. | |

OTHER PUBLICATIONS

International Search Report for PCT Application No. PCT/2017/025787, dated Jul. 3, 2017.

* cited by examiner

800
802
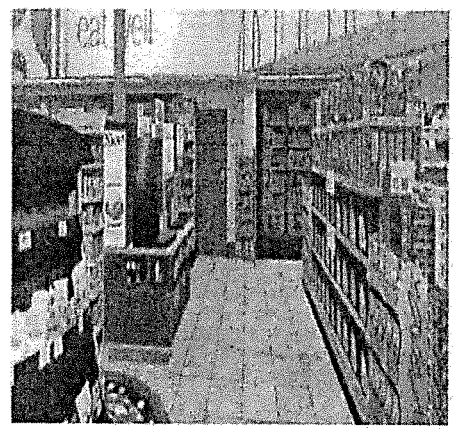
804
806
FIG. 8

VIRTUAL REALITY PLATFORM FOR RETAIL ENVIRONMENT SIMULATION

CROSS-REFERENCE TO RELATED APPLICATIONS

This application is the U.S. National Stage of PCT International Application No. PCT/US2017/025787, filed Apr. 3, 2017 which claims the benefit of priority from U.S. Provisional Application No. 62/317,199, filed Apr. 1, 2016; U.S. Provisional Application No. 62/319,186, filed Apr. 6, 2016; and U.S. Provisional Application No. 62/319,243, filed Apr. 6, 2016, all of which applications are incorporated fully herein by reference.

BACKGROUND

A virtual reality (VR) device is a system of computer hardware and software, primarily including a head-mounted display device, which provides a simulated environment to the wearer and creates a highly immersive experience. The head-mounted display, or headset, is designed to obscure the wearer's actual environment and replace it with a computer-generated simulation of a different environment. The VR device may include one or more controllers which are typically hand-held and allow the wearer to interact with the simulated environment. The headset and controllers attach to, or communicate with, a computing device, such as a desktop or tablet computer or a smartphone. The computing device stores and executes software and device interfaces to produce the simulated environment and process user inputs.

VR devices have existed in various forms for decades, but success in the commercial marketplace has largely eluded them. Presently, however, several newly or nearly released virtual reality devices are expected to finally bring truly immersive virtual reality to fruition. The anticipated success is based on novel device design approaches, advances in graphics and data processing power and transmission speeds, and manufacturing efficiencies that can reduce the device cost to consumer-manageable levels. As VR devices become more widely adopted and more attuned to the wearer's immersion and control needs, opportunities are emerging for creating entirely new platforms that use VR environmental simulations to present content, accomplish tasks, and facilitate communication between people.

Consumer retail is a highly competitive marketplace that is constantly evolving and businesses and store owners must constantly work to create a shopping experience that drives sales and fosters repeat visits. The growth of data-driven models have shown that making changes such as store layout, marketing or promotional signage, or other in-store merchandising concepts can have profound effects on sales. In practice, implementing these changes in a physical store can be costly, time-consuming, and disruptive to normal operations, and often it requires ad hoc adjustments or even complete re-working to optimize outcomes. As described herein, a VR device can be used to improve a person's retail product purchasing experience. Retailers can create, modify, and evaluate virtual stores where an unlimited number of retail concepts can be tested, gaining data about what does and does not work in the retail space. Businesses and store owners can share, and review virtual merchandise displays, promotional or marketing signage or other concepts with remote colleagues saving travel and eliminating the need for costly physical mock-ups.

Customers may always be able to physically visit a retail store and purchase items from the shelves, but consumer spending via e-commerce continues to increase in popularity. Unfortunately, e-commerce takes place on websites and in mobile device applications; e-commerce is two-dimensional shopping that has advantages such as convenience and availability of data, but it cannot replace the immersion and product interactivity experiences of visiting the retail store. An environmental simulation platform that integrates the benefits of both in-person retail shopping and e-commerce would be advantageous.

SUMMARY

The present disclosure provides a virtual reality (VR) platform implemented in hardware and software, which provides environmental simulations of creating, editing, and displaying retail stores for presentation on a VR device. The platform is configured to immerse the user of the VR device within the simulation to provide an environment in which the user can, solely or in cooperation with other users, assemble computer-simulated representations of retail store layouts and the products therein. The platform further enables environments and representations to be shared across multiple VR devices in review and revision simulations. The platform further enables the use of such environmental simulations to ultimately provide a human-scale retail shopping experience to customers.

The platform may dynamically create, store, and retrieve product components, process user inputs (e.g., interactions with the simulated environment, voice commands, etc.) for assembling products using dimensional, spatial, geometric, or image data and rendering visual representations within a virtual simulation. A VR device may be capable of presenting scalable, three-dimensional product assembly designs to other VR devices connected through a communication network for feedback and review. The presenting VR device may be capable of making changes to the designs based on feedback provided, such as by colleagues. The environmental simulation may include visual representations of products, and may enable a user such as a retail customer to interact with the visual representations. The user may be able to purchase a product through the simulation, and the platform may facilitate the purchase transaction.

The platform may process data related to the user, data relating to the products, data relating to purchases from the merchants, and/or other market data to identify products that are relevant or possibly relevant to the user. The platform may generate the environmental simulation to include the identified relevant products, thereby creating a virtual storefront that is customized to the user. The simulation may include computer-controlled avatars that can serve as cashiers, shopping assistants, and other persons common to retail shopping. The platform may synchronize the presentation of the environmental simulation to multiple VR devices simultaneously, and may enable multiple users to see, hear, and interact with each other via their respective avatars within the simulation.

In one implementation, the present invention is a device for generating a virtual reality (VR) simulation of a retail store. The device comprises one or more electronic data stores that alone or in combination store map data including a first store map describing interior structures of the retail store, the interior structures including floor space, walls, and doors; asset data describing a plurality of layout elements for organizing the retail store and a plurality of products sold in the retail store; and store plan data describing at least a first arrangement of the plurality of layout elements and the plurality of products with respect to the first store map. The invention includes a VR platform in communication with the one or more electronic data stores and with an immersive first VR display device that transforms simulation data into the VR simulation and presents the VR simulation to a first user of the first VR display device such that the user perceives a retail store environment representing the retail store at a human scale. The VR platform comprises one or more hardware computing devices executing computer-implemented instructions that upon execution cause the VR platform to obtain access to the first store map, the store plan data, and the asset data to generate a simulated store environment based on the first store map; generate a plurality of asset objects from the asset data, the plurality of asset objects comprising visual representations of each of the plurality of layout elements and the plurality of products referenced in the first arrangement; insert the plurality of asset objects into the simulated store environment in accordance with the first arrangement to produce the simulation data; send the simulation data to the first VR display device; receive a user input from the first VR display device, the user input provided by the first user during presentation by the first VR display device of the VR simulation; determine that the user input indicates a modification of one or more of the plurality of asset objects; modify, based on the modification, the first arrangement to produce a second arrangement of the plurality of layout elements and the plurality of products with respect to the first store map; and store the second arrangement in the one or more electronic data stores as the store plan data.

One or more electronic data stores may further store, alone or in combination, user data identifying the first user and a second user of an immersive second VR display device in communication with the VR platform. The plurality of asset objects may include a first layout object representing a first layout element, of the plurality of layout elements, in a first configuration and positioned at a first location on the first store map; and the one or more hardware computing devices further execute the instructions to cause the VR platform to send the simulation data to the second VR display device to cause the first VR display device and the second VR display device to display the VR simulation of the simulation data as a synchronized simulation wherein the first user and the second user experience the same retail store environment.

Before modifying the first arrangement, the invention may determine that the user input comprises an indication that the modification is approved by the first user and the second user; and modifies the first arrangement based on the user input. The hardware computing devices determine that the modification changes the first layout object to one or both of a second configuration and a second location; and generate the second arrangement to include the first layout object in one or both of the second configuration and the second location.

In another implementation, one or more hardware computing devices further execute the instructions to cause the VR platform to determine that the user data identifies the first user as a presenter and the second user as a viewer; and before receiving the user input it receives a viewer user input from the second VR display device. The viewer user input comprises the modification, and causes the first VR display device to display to the first user a prompt to approve the modification proposed by the second user via the viewer user input. The user input comprises a response of the first user to the prompt.

In another implementation, the one or more electronic data stores, alone or in combination, are configured to store usage data describing interactions of users with the retail store environment. The one or more hardware computing devices further execute the instructions to cause the VR platform to cause the first VR display device to generate first usage data describing each interaction in the VR simulation of the first user with one or more target asset objects of the plurality of asset objects, the first usage data including the user input, wherein the user input comprises one or more of a number of times the first user interacted with each of the one or more target asset objects, an amount of time spent by the first VR display device displaying a field of view including each of the one or more target asset objects to the first user, and information indicating that the first user initiated a purchase of one or more of the plurality of products by interacting with the one or more target asset objects. The device may receive the first usage data, integrate the first usage data with the usage data stored in the one or more electronic data stores to produce aggregate usage data and determine, based on the aggregate usage data, that the modification includes changing one or more properties identified in the first arrangement for one or more of the one or more target asset objects.

In another implementation, the device includes one or more electronic data stores, alone or in combination, that are configured to store user data identifying the first user and describing one or more shopping preferences of the first user; and one or more hardware computing devices that further execute the instructions to cause the VR platform to compare the aggregate usage data and the user data to determine, from the plurality of products, a plurality of preferred products associated with the one or more shopping preferences of the first user and produce the second arrangement such that the plurality of asset objects in the VR simulation generated based on the second arrangement includes representations of, from the plurality of products, only the plurality of preferred products.

In another implementation, one or more hardware computing devices further execute the instructions to cause the VR platform to generate, from the asset data for each of the plurality of products and each of the plurality of layout elements, a corresponding 3D model to produce a plurality of 3D models and to send the plurality of 3D models to the first VR display device. This causes the first device display device, while displaying the VR simulation, to enable the first user to select one or more of the plurality of products for display on a first visual representation of a first layout element of the plurality of layout elements, to receive from the first user a selection of a first product of the plurality of products, to determine that the visual representation of the first product is a first 3D model of the plurality of 3D models, to insert a first new asset object into the VR simulation, to enable the user to place the first new asset object in a desired location on the first layout element, the desired location corresponding to a new asset location on the first store map; and to send the user input comprising the first product and the new asset location to the VR platform.

Another implementation is a system for generating a virtual reality (VR) simulation of a retail store, the device comprising a plurality of electronic data stores and one or more hardware computing devices in communication with the plurality of electronic data stores and with an immersive first VR display device that transforms simulation data into the VR simulation and presents the VR simulation to a user of the first VR display device such that the user perceives a retail store environment representing the retail store at a human scale. One or more hardware computing devices executing computer-implemented instructions that upon execution cause the one or more hardware computing devices to receive, from one or more of the plurality of electronic data stores, asset data associated with a plurality of products and a plurality of layout objects configured to display one or more of the plurality of products, a store plan for the retail store, the store plan comprising at least a store map and a layout, with respect to the store map, of the plurality of layout objects. The hardware computing devices obtain, based on the asset data, a plurality of layout object models each comprising a 3D computer graphic model of one of the plurality of layout objects, generate, based on the store plan, the simulation data, wherein the simulation data comprises a simulated store environment including the plurality of layout object models and configured to display visual representations of the plurality of products, and send the simulation data to the first VR display device.

In the system, one or more hardware computing devices further execute the instructions to cause the one or more hardware computing devices to determine that the store plan describes an arrangement of the plurality of products for display in relation to the plurality of layout object models, to obtain, based on the asset data, one or more asset objects each comprising a 3D computer graphic model of one of the one or more selected products, and to insert the one or more asset objects into the simulated store environment in accordance with the store plan.

In the system, one or more hardware computing devices further execute the instructions to cause the one or more hardware computing devices to identify, in the asset data associated with a first selected product of the one or more selected products, packaging data for the first selected product, the packaging data including a package type, a set of dimensions, and one or more images representing each viewable side of the corresponding 3D computer graphic model of the first selected product. The hardware computing devices generate a blank 3D model having a shape identified by the package type, scale the blank 3D model according to the set of dimensions to produce a scaled 3D model, render the one or more images onto the scaled 3D model to produce the corresponding 3D computer graphic model of the first selected product, and create a first asset object of the one or more asset objects, the first asset object including the corresponding 3D computer graphic model of the first selected product and an asset identifier used by the first VR display device to enable interactions by the user with the first asset object within the VR simulation.

In the system, one of the plurality of data stores is a user data store comprising user data identifying a first user of the system and describing one or more attributes of the first user, the one or more hardware devices are further in communication with a plurality of external data stores, and the one or more hardware computing devices further execute the instructions to cause the one or more hardware computing devices to receive the user data from the user data store, obtain, from one or more of the plurality of external data stores using the user data, purchasing data describing one or more of previous sales of the plurality of products, purchases by the first user of one or more of the plurality of products, purchasing behavior of other users of the system having the one or more attributes, and marketing information for one or more of the plurality of products.

The devices identify one or more relationships between the user data and the purchasing data to produce a user profile associated with the first user and describing one or more shopping preferences of the user, determine, from the plurality of products and based at least on the user profile, a plurality of preferred products that are relevant to the one or more shopping preferences, and create the arrangement to include display of the plurality of preferred products.

Executing the instructions may cause the one or more hardware computing devices to cause the first VR display device to generate first usage data describing each interaction in the VR simulation of the first user with a first asset object of the one or more asset objects, the first usage data including one or more of: a number of times the first user interacted with the first asset object; an amount of time spent by the first VR display device displaying a field of view including the first asset object; and, information indicating that the first user initiated a purchase of one or more of the preferred products by interacting with the first asset object. The computing devices receive the first usage data and integrate the first usage data with the user profile.

Executing the instructions may further cause the one or more hardware computing devices to send the simulation data to an immersive second VR display device in communication with the one or more hardware computing devices, cause the first VR display device and the second VR display device to display the VR simulation of the simulation data as a synchronized simulation wherein a first user of the first VR display device and a second user of the second VR display device experience the same retail store environment, receive, from one or both of the first VR display device and the second VR display device, feedback data describing one or more user interactions with the VR simulation, determine that the feedback data describes one or more modifications to one or both of the layout of the plurality of layout objects and the arrangement of the one or more asset objects, and modify the store plan to reflect the one or more modifications. The system wherein the one or more hardware computing devices further execute the instructions to cause the one or more hardware computing devices to, before modifying the store plan, determine that the feedback data comprises an indication that the one or more modifications are approved by the first user and the second user.

Executing the instructions may further cause the one or more hardware computing devices to obtain, from the plurality of electronic data stores, user data associated with the first user and the second user, determine that the user data identifies the first user as a presenter and the second user as a viewer, and before modifying the store plan, determine that the feedback data comprises a first indication that interactions of the second user generated the one or more modifications, and a second indication that the one or more modifications are approved by the first user.

Executing the instructions may further cause the one or more hardware computing devices to send the simulation data to a third display device in communication with the one or more hardware computing devices, cause the third display device to display the VR simulation of the simulation data together with the first VR display device and the second VR display device as the synchronized simulation, generate a plurality of identification tokens each comprising a user identifier and a user graphical representation, each identification token of the plurality of identification tokens being associated with a corresponding user of a plurality of users including the first user, the second user, and the third user, determine that the first user is using the first VR display device and the second user is using the second VR display device, send, of the plurality of identification tokens to the third display device, a first token identifying the first user and a second token identifying the second user; and cause the third display device to display, together with the VR simulation, an interface indicating that the first user and the second user are active in the synchronized simulation, and including the corresponding graphical representations of the first token and the second token.

Executing the instructions may further cause the one or more hardware computing devices to, determine that the first user is accessing the system via the first VR display device and the second user is accessing the system via the second VR display device; and before sending the simulation data to the first VR display device and the second VR display device generate a first avatar object visually representing the first user, generate a second avatar object visually representing the second user; and insert the first avatar object and the second avatar object into the simulation data to enable the first user and the second user to see each other in the synchronized simulation.

Executing the instructions may further cause the one or more hardware computing devices to generate a user interface object enabling the user to select any of the plurality of products to be visually represented in the retail store environment; insert the user interface object into the simulated environment to generate the simulation data; during presentation by the first VR display device of the VR simulation to a first user of the VR display device, cause the first VR display device to activate the user interface object in response to a first user input requesting the activation, receive a second user input from the first VR display device, determine that the second user input includes a selection, by the first user using the user interface object, of a first product of the plurality of products, obtain, based on the asset data associated with the first product, a first asset object comprising a 3D computer graphic model of the first product, send the first asset object to the first VR display device, cause the first VR display device to include the first asset object in the VR simulation and to enable the first user to position the first asset object for display on a first layout object of the plurality of layout objects; receive a third user input from the first VR display device, determine that the third user input identifies a position of the first asset object with respect to the first layout object, and update the store plan to indicate that the first layout object displays one or more instances of the first product at the position.

The plurality of electronic data stores may store a plurality of speech tags each describing a corresponding voice command of a plurality of voice commands, and the one or more hardware computing devices further execute the instructions to cause the one or more hardware computing devices to receive a user input from the first VR display device; determine that the user input comprises speech of the first user, determine that the speech identifies a search command of the plurality of voice commands, and further identifies one or more search terms, determine that the one or more search terms identify a first product type of a plurality of product types associated with the plurality of products, identify, from the plurality of products, a plurality of selected products having the first product type, obtain, based on the asset data associated with the plurality of selected products, a plurality of asset objects each comprising a 3D computer graphic model of one of the plurality of selected products, and send the plurality of asset objects to the first VR display device.

The asset data may further be associated with a plurality of marketing objects describing signage of the retail store, and wherein to generate the simulation data, the one or more hardware computing devices further execute the instructions to cause the one or more hardware computing devices to obtain, using the asset data, graphical models of the plurality of products and the plurality of marketing objects; and insert the graphical models into the simulated store environment based on the store plan, such that the VR simulation presents the retail store environment to the first user as an assembled store environment capable of replacing a physical mock store simulating the retail store.

Executing the instructions may further cause the one or more hardware computing devices to receive a user input indicating a selection of a first perspective or a second perspective; and responsive to the user input, causing the first VR display device to display, based on the selection, the VR simulation from the first perspective or the second perspective, wherein the first perspective comprises a field of view of the retail store environment at the human scale, wherein the first user is enabled to move the field of view throughout the retail store environment at a first-person perspective; and the second perspective comprises a model view of the retail store environment, in which the entire simulated store environment, representing the store plan, is shown from above.

The foregoing and other advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF DRAWINGS

FIG. 8 is a diagram of an exemplary viewer VR terminal, in different scales, for a VR platform enabling simulation review.

DETAILED DESCRIPTION

Figure 1A:
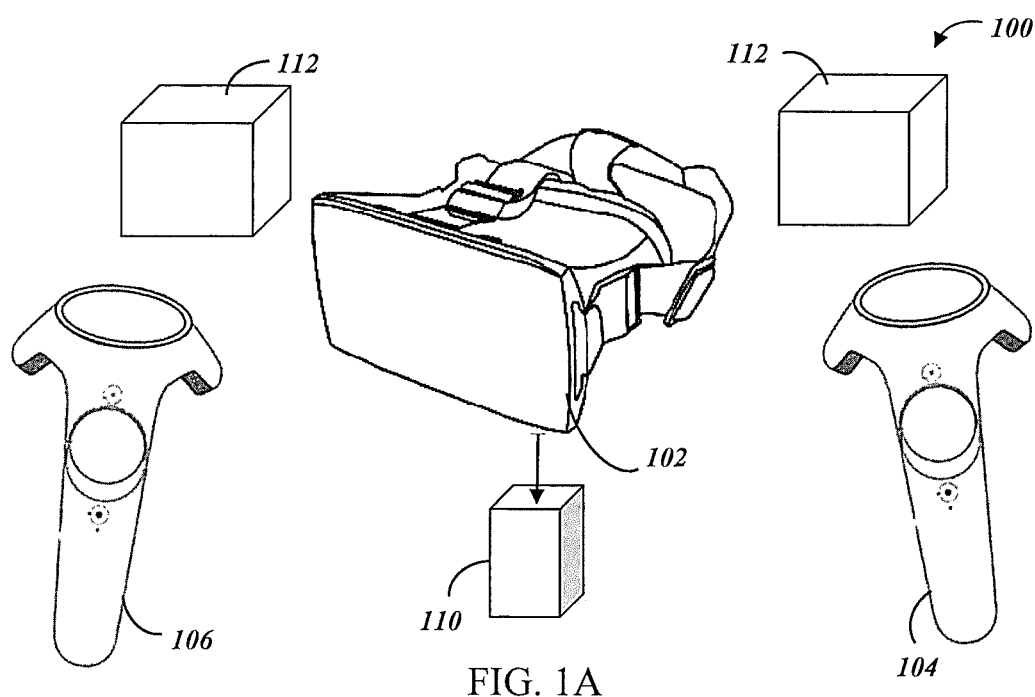
FIGS. 1A and 1B are diagrams of an exemplary virtual reality (VR) device for implementing the systems and methods of the present disclosure.

The present disclosure provides systems, device configurations, and processes for assembling three-dimensional products and environment layout designs, such as a retail store, sharing and reviewing the designs, and ultimately generating realistic interactive environmental simulations which can be presented on a virtual reality (VR) device. Traditionally for changes to retail store layout designs or other store fixtures, reviewers such as company executives may be invited to one location where a mock store may be setup. The mock store may display designs for arranging the shelves and configurations for stocking merchandise. The reviewers of the design may have to physically visit the mock store and view the design in order to provide feedback. In the event the reviewers request the significant changes to the design, the reviewers may have to leave and travel back to the location to review the changes. The present disclosure provides a platform for VR technology to facilitate creating and modifying retail concept designs and remotely reviewing them within simulated virtual environments such as a retail store. When utilized by possible customers, the VR platform in the disclosure determines information about the purchase preferences of a user of the VR device, uses the information to identify products relevant to the user, and generates a VR simulation of a customized retail store that contains the identified products. The present VR platform may further couple the simulation with a transaction processor to enable the user to make purchases of products within the user's customized store. The present VR platform and the methods it implements for processing user data, purchase data, and other marketing data can significantly reduce the time and computational overhead that would otherwise be needed to connect the user with products the user wants to buy. The VR platform and its generated simulations provide a realistic, human-scale shopping experience to the user, increasing the amount of data available to the user and making the user more comfortable with purchases, in contrast with the typical e-commerce experience. The amount of products presented can be significantly narrowed to only those that are relevant to the user, improving shopping efficiency over that of actual retail stores that are filled with irrelevant products.

In some embodiments, encompassing the design, review, or customer usages, the present VR platform may be implemented on user devices having standard two-dimensional computer screens or other conventional displays. However, only some of the VR platform's advantages may be thus realized. Computer monitors do not provide an immersive experience that compares to that of a true VR device, such as that of FIG. 1. The user cannot experience virtual shopping at human-scale, as understood within the present disclosure, without a VR device. In consideration of such advantages, generating a usable, realistic simulation on a VR device presents unique challenges, which the present VR platform addresses as described below. Some described solutions are or may easily be generalized for implementation on any modern VR device, while other solutions may be implemented on VR devices having particular components.

VR Device Configurations

Figure 1B:
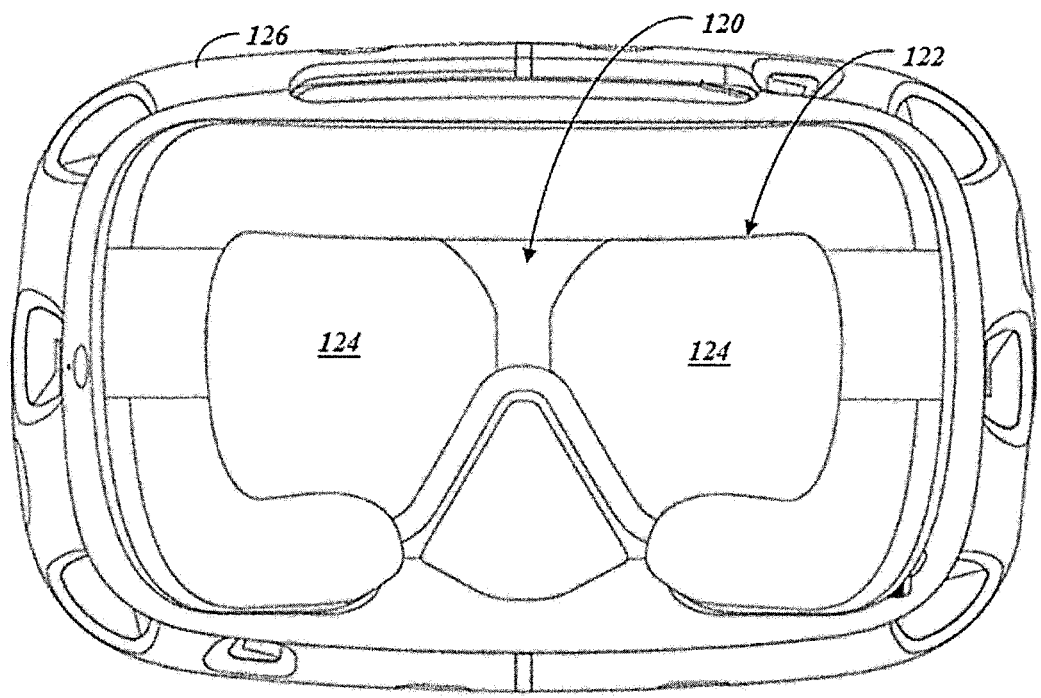

FIGS. 1A and 1B illustrate a VR device 100 capable of implementing or operating within the present VR platform. Suitable known implementations of the VR device 100 include, without limitation, the HTC VIVE (illustrated in FIGS. 1A-B), the OCULUS RIFT and TOUCH, the SAMSUNG GEAR VR, and the SONY PLAYSTATION VR. In some embodiments, the VR device 100 may include a head-mounted display device or "headset" 102 and one or more handheld controllers 104, 106. In other embodiments, the headset 102 may be replaced with other display technology, such as hologram generators or other projectors that create an immersive graphic display. Additionally or alternatively, the handheld controller(s) 104, 106 may be replaced by movement sensing systems that attach to or track the user and can detect gestures and other movements of the user.

The VR device 100 may further include a computing device 110 to which the headset 102 and/or other components (e.g., controllers 104, 106) connect. The computing device 110 may perform data retrieval and processing functions in furtherance of the methods of generating the presently described environmental simulations, and may itself generate simulation data describing the environmental simulation, and may send the simulation data to the headset 102. The computing device 110 may be configured with appropriate hardware or software to perform the simulation generating processes. Exemplary hardware includes graphics processors and other suitable processors, data network interfaces, input/output ports and other peripheral device interfaces, and the like. Any computing device may be assembled and/or configured with the present hardware and software modules, and the disclosure contemplates home and office desktop computers, personal assisting devices, mobile computing devices such as tablet computers and smartphones, gaming and other dedicated consoles, and the like, as non-limiting examples only. The computing device 110 may be configured to connect to a local area network (LAN), a Wi-Fi network, a wide area network (WAN), or another communication network, and may transmit data to and receive data from other devices on any connected networks, including other user devices, remote servers, other components of the VR device 100, and the like. In other embodiments, some or all of the functions of the computing device 110 may instead be performed by a remote server (not shown) as described further below. Additionally or alternatively, the computing device 110 may be integrated into the headset 102 or another component of the VR device 100.

The headset 102 may include a display assembly 120 configured to present an immersive visual representation of the environmental simulation to the headset 102 wearer. The display assembly 120 may include one or more display devices 122 that receive the simulation data, transform the simulation data into the visual representation according to the format of the display assembly 120, and display the visual representation on one or more screens (not shown). The display devices 122 may employ any display technology suitable for rendering high-resolution computer graphics; non-limiting examples include light-emitting diode (LED) displays, organic light-emitting diode (OLED) displays, active-matrix OLED (AMOLED) displays, liquid crystal displays (LCDs), electrowetted displays, and the like. In some embodiments, the display devices 122 may utilize a very low-latency technology in order to respond to movements of the wearer as quickly as possible. In one example, AMOLED screens are used due to the ability of AMOLEDs to switch colors in less than one millisecond. Reducing latency increases realism of the VR device's 100 simulation and reduces motion sickness associated with proprioceptive discordance.

The display devices 122 may cooperate with one or more optical assemblies 124 that distort the image generated by the display devices 122 to fill the wearer's field of vision. In one non-limiting example, the optical assemblies 124 may be two magnifying lenses each positioned in front of one of the wearer's eyes. In some embodiments, the display assembly 120 may present a stereoscopic (or other three-dimensional representation), full-field visual representation to the wearer. To achieve this, the display devices 122 may render the simulation data into two slightly different images depicting left-eye and right-eye views of the same scene; furthermore, the simulation data may describe a visual representation of the simulated environment that is distorted to counteract the distortion effected by the optical assemblies 124. The headset 102 may further include resilient material 126 that contacts the wearer's face and forms a complete perimeter around the wearer's eyes, blocking out light from the user's actual environment.

The headset 102 may include positional tracking devices such as gyroscopes, accelerometers, magnetometers, outward-facing cameras, infrared LEDs, and other motion sensors. The positional tracking devices may be coordinated to detect rotation, translation, and/or acceleration of the wearer's head, and may generate corresponding position data and transmit it to the computing device 110. The computing device 110, in turn, updates the position, body orientation, and/or field-of-view orientation of the wearer's avatar in the simulation. Additionally or alternatively, the VR device 100 may include external position tracking devices 112, such as laser tracking modules, that may be mounted in a room and used to track the wearer's position as well as to define the bounds of the virtual reality space (i.e., to identify real walls and warn the wearer before a collision).

The hand-held controllers 104, 106 of the VR device 100 may also include positional tracking devices, or their positions may be tracked by the headset's 102 positional tracking devices or the external position tracking devices 112. The controllers 104, 106 may have their own avatars in the simulation, essentially serving as the wearer's hands or another tactile anchor from the actual world to the VR simulation. The controllers 104, 106 may include any suitable arrangement of user input devices, including buttons, pressure-sensitive touchpads, accelerometers, and the like.

The VR device 100 may further include an audio feedback system (not shown) for emitting audio signals to the wearer. The audio feedback system may include speakers built into the headset 102, separate over-ear or in-ear headphones, remote speakers connected to the computing device 110, or another suitable sound-emitting device. The VR device 100 may also include an audio input device (not shown), such as a microphone built into the headset 102 or separate from the headset 102.

Figure 2:
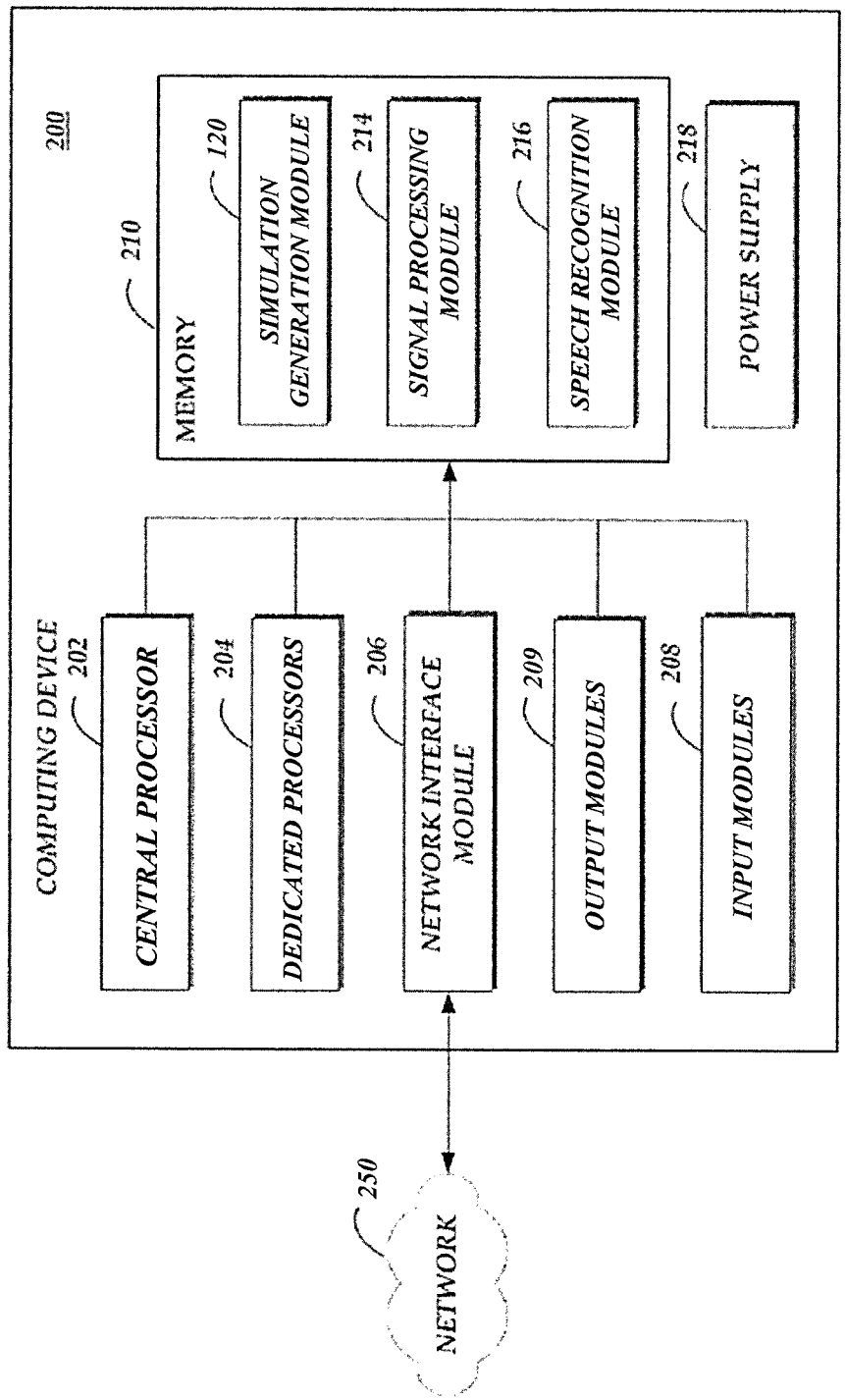
FIG. 2 is a schematic of exemplary components of the VR device of FIG. 1.

FIG. 2 illustrates a component view of a computing device 200 that can perform the present data collection and analysis and simulation generation processes. The computing device 200 may be the separate computing device 110 of the VR device 100 of FIGS. 1A-B, or may be integrated into the headset 102 of the VR device 100, or may be one or a plurality of remote servers, or may be a combination of local and remote devices. The computing device 200 includes a central processor 202, one or more dedicated processors 204 for tasks such as audio or graphic processing, a network interface module 206, one or more input modules 208, one or more output modules 209, and memory 210, all of which may communicate with one another by way of a communication bus. The computing device 200 may also include a power supply 218, which may provide power to the various components of the computing device 200.

The central processor 202 and dedicated processor(s) 204 may include one or more microprocessors specially configured to communicate with the memory 210 to implement various software modules and associated program instructions stored therein; such modules include a simulation generation module 120, a signal processing module 214, and a speech recognition module 216. The memory 210 generally includes RAM, ROM, flash memory, solid state memory, and/or other persistent or non-transitory computer-readable storage media. The simulation generation module 120 may be stored as program instructions in memory. When executed by the processor(s) 202, 204 the simulation generation module 120 may configure the processor(s) 202, 204 to generate the environmental simulation for the VR device as described herein. Execution of the simulation generation module 120 may configure or instruct the processor(s) 202, 204 to access and/or use other modules of the computing device 200, including without limitation: accessing or using an audio processor to retrieve device-readable audio input; accessing or using a video and/or graphics processor to render or otherwise process graphical data; accessing the input modules 208 to receive input data or other signals from positional tracking devices, user-controlled input devices, and the like; executing the signal processing module 214 to obtain data and/or instructions from received input data; and, executing the speech recognition module 216 to convert audio input identified as speech into known operations and performing the operations on simulation data.

The memory 210 may additionally store a signal processing module 214 that provides computer program instructions for use by the central processor 202 in analyzing a received signal, such as input data. The signal processing module 214 may include executable algorithms to identify input data as audio data, positional data, user action data, user command data, and other types of data relevant to the operation of the computing device 200. The memory 210 may additionally store a speech recognition module 216 that provides computer program instructions for use by the central processor 202 in identifying that an audio input contains speech, and/or contains particular words or phrases, such as known commands or other operations that affect the simulation. The speech recognition module 216 may be any program that produces speech recognition results, such as a dictation application, a speech processor native to the operating system of the computing device 200, or an application programming interface. The memory 210 may store one or more language models for key words and phrases, and the speech recognition module 216 may configure the central processor 202 to compare the audio input to the stored language model to identify the contents of the audio input.

The dedicated processors 204 may be a group of microprocessors, an integrated or discrete circuit, or a software-implemented module, that performs particular operations on particular types of data. In one embodiment, the dedicated processors 204 include an audio processor that converts an acoustic signal received by the computing device 200, or an electrical signal representing the acoustic signal, into an audio input that is readable by the central processor 202. In one example, the audio processor may be an analog-to-digital converter. The audio processor may receive the signal generated by an input module 208 and generate the audio input therefrom. Thus, the input modules 208 may include an audio input device, such as a microphone or array of microphones, whether analog or digital. The microphone or array of microphones may be implemented as a directional microphone or directional array of microphones. In some embodiments, the input modules 208 receives and records the acoustic signal and outputs the recording to the audio processor. The input modules 208 may also receive instructions from the audio processor to set a sampling rate (whether in sample rate or bitrate) for obtaining audio. The input modules 208 may also (or instead) include one or more piezoelectric elements and/or micro-electrical-mechanical systems (MEMS) that can convert acoustic energy to an electrical signal for processing by the audio processor. The input modules 208 may further be provided with amplifiers, rectifiers, and/or other audio processing components as desired.

In some embodiments, the dedicated processors 204 may include a video and/or graphics processor that converts raw simulation data into simulation data that can be rendered to a display device. The graphics processor may be a graphics processing unit or collection thereof, or may be a graphics card. The graphics processor may send the converted simulation data to an output module 209, which may be a video output interface of the computing device 200 to which one or more display devices are attached. Suitable output interfaces include digital visual interface (DVI), video graphics array (VGA), and high-definition multimedia interface (HDMI), among others. The simulation generation module 120 may generate raw simulation data that distorts the visual representation, as described above, or the simulation generation module 120 may otherwise configure the graphics processor to render the raw simulation data to produce distorted simulation data that is then corrected by the optics of the headset during display.

The network interface module 206 may provide the computing device 200 with connectivity to one or more networks 250, such as a LAN or a wide-area network. The network interface module 206 may additionally or alternatively enable peer-to-peer connectivity directly to other devices, such as via Bluetooth or Wi-Fi Direct. The central processor 202 may send instructions and information to, and receive instructions and information from, remote VR devices, remote servers, and other computing devices that also communicate via the network 250. In some embodiments, the network interface module 206 comprises a wireless network interface that provides the computing device 200 with connectivity over one or more wireless networks.

The input modules 208 may further include one or more cameras or other image/video capture devices. The central processor 202 or a graphics processor may execute the signal processing module 214 to analyze videos or images captured by the camera, and may then execute the simulation generation module 120 to update the simulation data if needed. Similarly, the input modules 208 may include the positional tracking devices or interfaces thereto, and the central processor 202 may execute the signal processing module 214 to analyze received position data, and may then execute the simulation generation module 120 to update the simulation data if needed. In some embodiments, the central processor 202 may set a sample rate for the input module 208 to receive the data from position sensors. The sample rate may be set high enough (e.g., 1 kHz or 1000 samples per second) to allow the central processor 202 to determine the direction and speed of movement and interpolate or predict the position of the wearer in the near future; as a result, the central processor 202 and graphics processor can cooperate to pre-render simulation images and further reduce latency.

Other input modules 208 may include or connect to user input devices such as the VR device controllers, a keyboard or mouse, a touchscreen, and the like.

In addition to the video output interface(s), the output modules 209 may include a speaker or an array of speakers (or ports/interfaces for connecting speakers), along with any requisite electronic components for converting an analog or digital signal of the computing device 200 into an acoustic signal for output by the speaker. The output module 209 may receive and output results of an input command or inquiry, once the command/inquiry is processed by the computing device 200. The output module 209 may also output other audio data, such as music or other recorded audio stored in memory 210 or obtained via data stream from a remote device, audio data from other VR devices presenting the simulation, alerts to the wearer regarding proximity to walls or objects in the room, and the like.

While non-limiting exemplary hardware for implementing the VR device and associated portions of the VR platform has been described, it will be understood that other suitable hardware and software implementations may be derived from the examples without undue experimentation; some other exemplary implementations are described below.

Assembly Simulations

Figure 3:
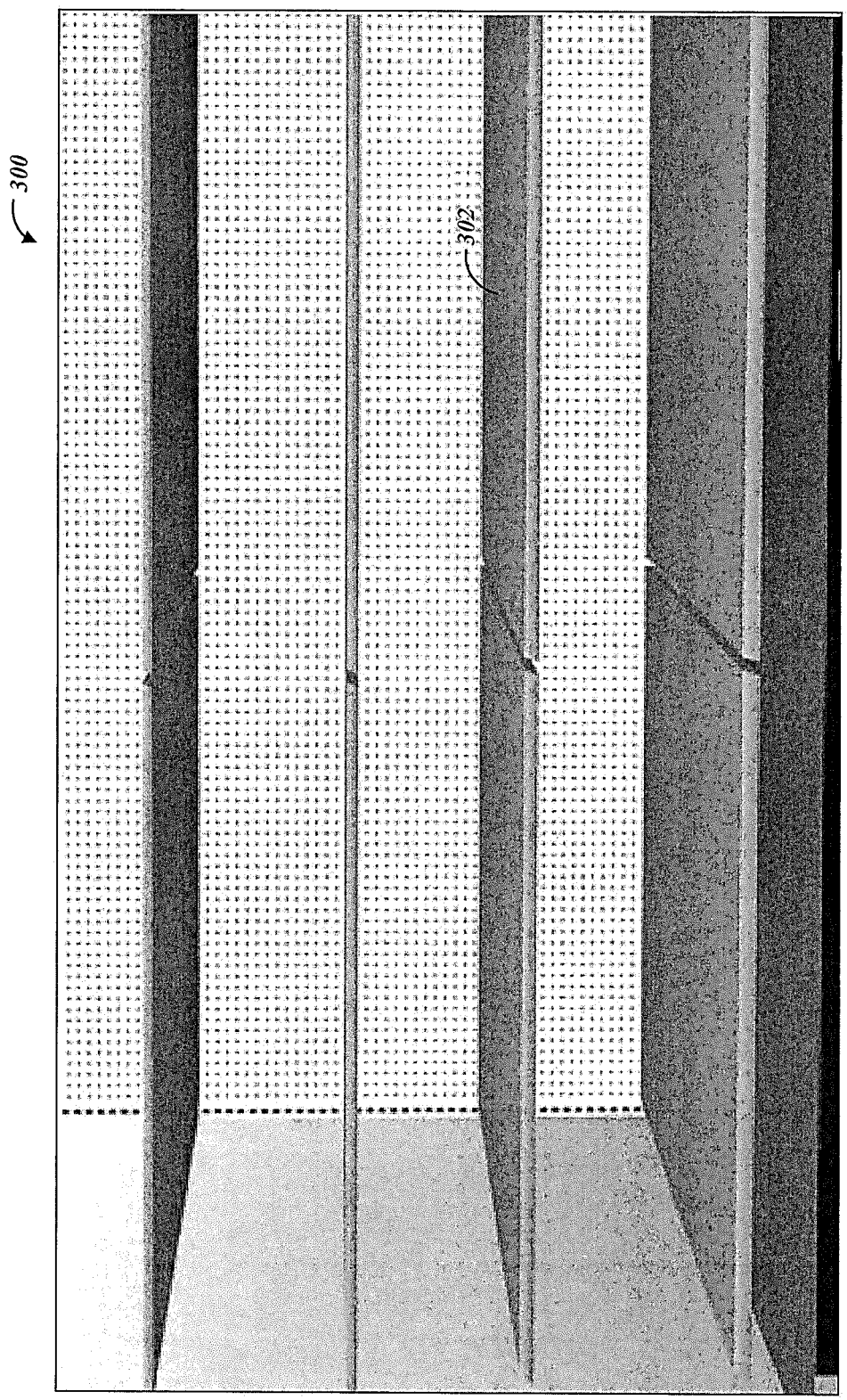
FIG. 3 is a screenshot of an exemplary generated VR environment in accordance with the present disclosure.

The VR platform may be used to visualize and simulate environments that can be presented and displayed in three-dimensions to a user on an immersive VR device. The details of the presently described embodiment pertain specifically to an interior retail store environment, though any open or enclosed environment may be simulated. The VR platform may be used to enable assembly of three-dimensional, visual representations of different aspects of the environment. In particular, a retail store environment may include the retail store's associated rooms, delineated regions (i.e., departments), hallways, aisles, endcaps, fixtures, and other interior features thereof. The configuration of floor space, ceilings, roof structures, heating and ventilation (HVAC), electrical, plumbing, and other systems, walls, doors, passthroughs, and other interior permanent (or otherwise immovable) structures may be determined from a store map that is stored in computer memory or in a data store accessible by the simulation generator. Alternatively, such configurations may be auto-generated by the simulation generator according to the amount and varying types of products to be displayed, or by constraints or other parameters provided by a user. The simulation may represent an entire retail store, or may represent a portion of the retail store, such as a certain region or department, a room, an aisle, or a discrete shelf space (e.g., an endcap) to be configured by planogram. FIG. 3 illustrates an exemplary visual representation 300 from the user's first-person perspective when the simulation is limited to a planogrammed space; in the illustrated example, only the shelves 302 in the region to be planogrammed are visible.

In an example of a VR enabled assembly process, the type of store environment to be simulated is chosen by a user, such as a grocery store or consumer electronics store. Assets specific to certain store types, or even to particular stores within a store type, may be uploaded and stored in databases and retrieved for assembly. As described herein, an "asset" is a data structure describing a particular physical object that may be placed within the retail store; the VR system interprets the asset, using information and graphics processing techniques characterized herein, to produce a visual representation of the asset, referred to herein as an "object," that can be placed in the simulation. While any retail store component may be simulated, most assets available to the VR platform may fall into three asset types: layout elements; products (i.e., merchandise sold in the retail store); and marketing elements such as wall hangings, signage, and catalogs. Layout elements delineate and organize space in the retail store environment. Non-limiting examples of layout elements include: shelf modules, refrigerator units (i.e., for refrigerated products in a grocery store), endcaps, racks, kiosks, and other display modules for displaying merchandise; sectional modules for delineating space, such as wall and divider elements, counters (e.g., a sales counter or department counter), cashier lanes, and the like; interactive elements such as automated teller machines and vending machines; furniture, mirrors, signage, and other functional or nonfunctional elements; and the like. Layout elements may themselves be configurable, with discrete configurations or ranges of configurations described by the asset data for the corresponding element. For example, a shelf module may be assigned a fixed height and width, but the number of shelves and the height of each shelf may be configurable by a user having the requisite permissions to do so. In some embodiments, the layout elements may include composite elements composed of multiple instances of one or more other layout elements. For example, the asset database may describe an "aisle" layout element composed of multiple shelf modules and/or refrigerator units placed end-to-end to represent one or both sides of a grocery store aisle.

The VR system may enable the user to select assets to be placed within the simulated store environment, such as on the shelves 302 in FIG. 3. When the user selects an asset to be added to the virtual environment, the VR platform uses information about the asset to create and visually render the asset within the virtual environment. The system creates and visually renders assets within the virtual simulation by combining stored data elements comprising several pieces of information provided by a user of the system or otherwise stored in the content library or database. The content library may include details of the asset such as spatial or geometric data, image data, meta-data, or other such information that may be necessary for generating a three-dimensional visual representation of that asset within the virtual environment. For example, within the database an asset describing a product may have a unique identifier that identifies a specific instance of the asset, and/or may have a unit identifier, such as a stock keeping unit (SKU) code, associated with the product represented by the asset. The database may include 1 to 10, or possibly more, 2D images of the asset representing views of the produce identified by the unit identifier and corresponding to the front, back, top, bottom, left or right sides of the asset that may be accessible to the user. The user may also upload additional images, asset dimensions, meta-data or product attributes, or specify a shape type to supplement existing asset information within the content library or to provide additional detail.

With this information about the asset, the platform first stitches the seams of the uploaded images together to create a panoramic image representing the entire asset wrapper. Then the platform generates a blank 3D model of the specified shape type and scales it using the specified dimensions, either from the content library or uploaded by the user. The panoramic image representing the asset is wrapped around the model to create a 3D model of the asset to scale. The output of this 3D model is then used to create the virtual simulation. The 3D model, along with its corresponding meta-data and other product attributes or categorical data about the asset, such as product type or package type may be stored in the content library. For example, the visual data for a box of coffee filters may include an indicator that the asset is a "box" package type, dimensions for the sides of the box, a weight of the box, images of one or more sides of the actual box of coffee filters, and parameters relating to interactivity of the asset. The simulation generator renders the images to a box object, assigns the dimensions of the box to the object, associates the box object with an identifier, and then can place the box object in the simulation.

Figure 4:
FIG. 4 is a screenshot of an exemplary generated VR environment demonstrating user manipulation of a simulated asset.

Ideally, the user may wear a VR headset that immerses the user within the rendered VR store environment. Using a controller, such as 104,106 in FIG. 1A, or other interface device, the user may interact with items from the content library, such as specific merchandise or marketing materials, and place them on shelves 302 or within the virtual store to create a retail store environment. Objects may be retrieved from the database using a user interface, such as the controllers 104, 106 from FIG. 1A, through a keyboard or mouse, or additionally or alternatively through voice commands. In an embodiment of the assembly process, certain attributes or components of assets may be stored as recognizable "speech" tags within the metadata for the asset in the content library database. Voice commands may be recognized by the speech recognition module in the central processor and matched to speech tags in the content library for the purpose of retrieving stored assets. For example, a user may say "Search coffee filters" to find available coffee filter selections and options for assembly. Using a controller, the user may then interact with the selection, such as placing it on a shelf or moving where it is located within the simulated environment. An example of this is illustrated in FIG. 4, where a virtual "arm" 402 is able to interact with a virtual object.

Figure 5:
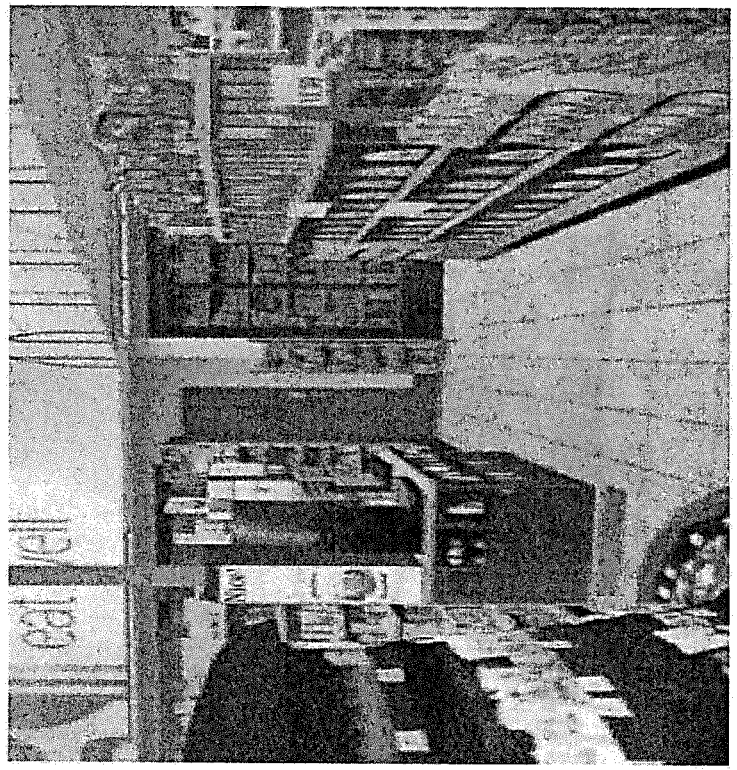
FIG. 5 is a screenshot of another exemplary generated VR embodiment in accordance with the present disclosure.

The configuration of components within the store can be adjusted or manipulated to test store layout ideas, visualize shelf configurations or store displays, or evaluate other design concepts for testing before implementing them in a real, physical store. FIG. 5 illustrates an example of an assembled simulated environment 500. As shown in FIG. 5, the assembled environment is a virtual three-dimensional grocery store at the human-scale, with aisles of shelves loaded with merchandise, descriptive signage, pricing information, and other aspects that would be found in a typical grocery store that a user may interact with.

Figure 6:
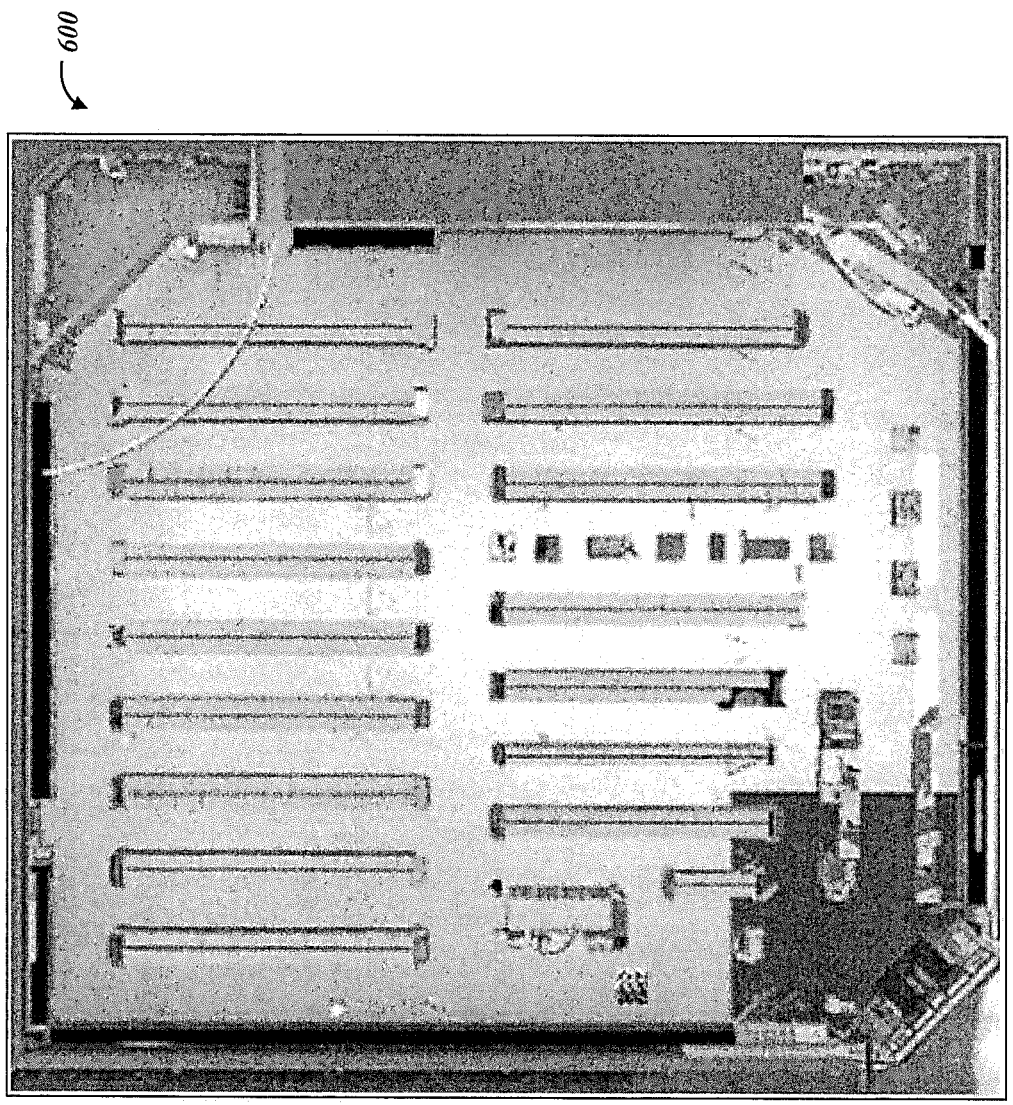
FIG. 6 is a screenshot of a model view of another exemplary generated VR embodiment in accordance with the present disclosure.

Other perspectives may additionally or alternatively be generated. For example, illustrated in FIG. 6, when an entire store is simulated, the visual representation 600 may be rendered from a "model" viewpoint, giving the impression to the user that he is looking down on a model of the store from any suitable perspective angle from zero degrees (parallel to the simulated store floor) to 90 degrees (perpendicular to the store floor, as shown in FIG. 6). The store may be simulated without a roof so that the user may view the layout of the interior of the store (i.e., aisles, shelves, cashier stations, room interiors, etc.) from the model perspective. The user may be enabled to change the perspective between the model viewpoint, at maximum distance, and the first-person perspective.

Within this virtual environment, many aspects of the shopping experience can be simulated and evaluated with regards to optimizing retail outcomes. The user may be able to navigate through the virtual store, examine and adjust planogrammed space, try new in-store concepts, or otherwise customize the store in ways that would be significantly more time-consuming and/or expensive to implement in a physical store. The immersive nature of the virtual reality display device further improves the effectiveness of assembling retail store simulations compared to existing solutions, by giving the user a human-scale, realtime realistic experience of viewing and interacting with the retail store environment.

Review Simulation

Figure 7:
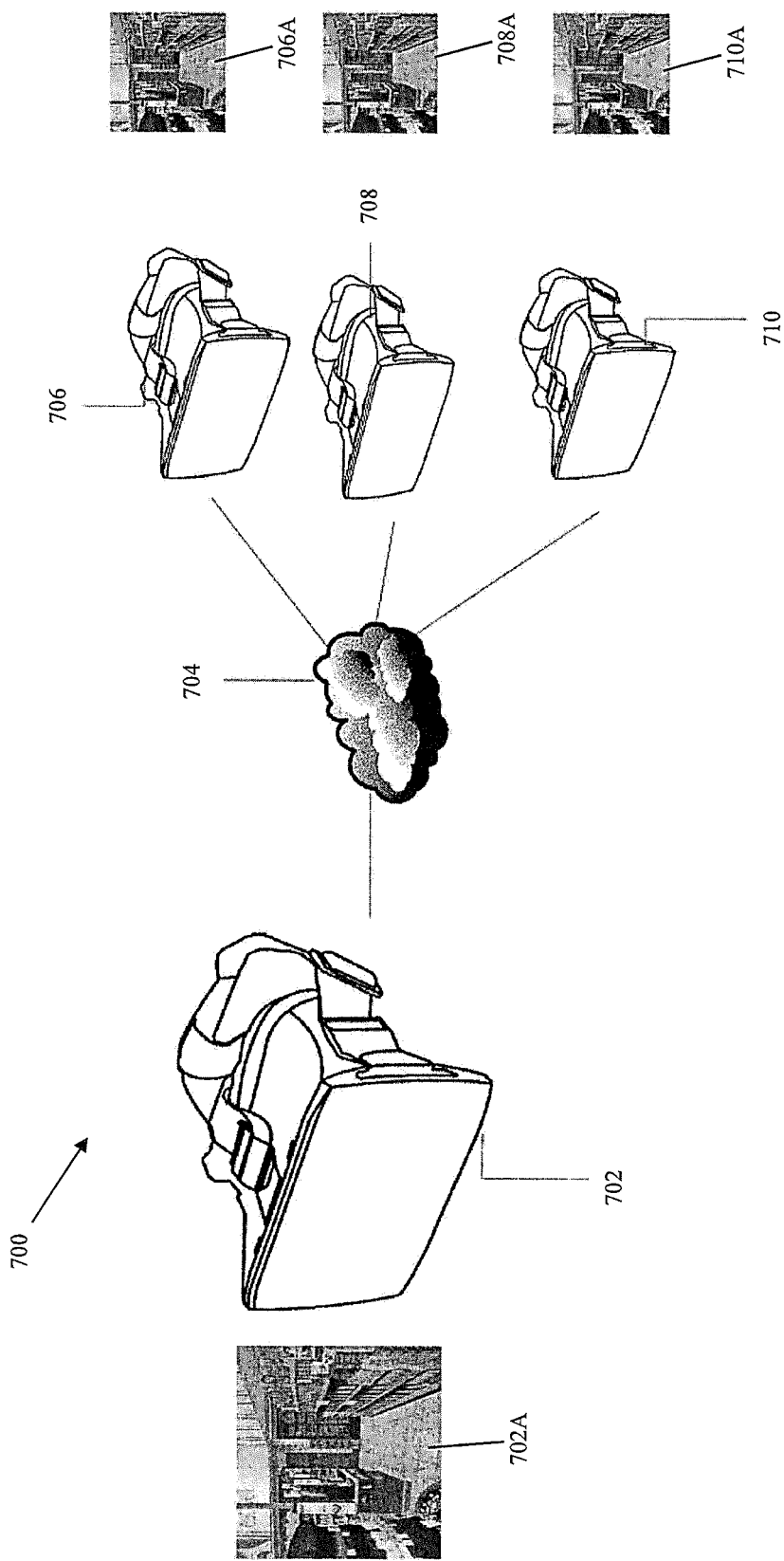
FIG. 7 is a diagram of an exemplary embodiment of a VR platform enabling a store layout review simulation.

The VR platform of the present disclosure also includes systems and methods for implementing a VR enabled review simulation. The product design, such as store layout, asset configuration, signage, or other in-store concepts may be presented on a VR devices and viewed on one or more devices. Each of the VR devices may be located remotely from each other in different geographic locations, and connect through a communication network. FIG. 7 illustrates a possible example embodiment of a VR platform 700 for performing review simulations of a model store. An assembled store environment (e.g., environment 500 from FIG. 5) is generated on a presenter VR device 702, and shared through the network 704, to three other viewer VR devices 706, 708, 710 where it can be viewed simultaneously. In particular, the store environment may be viewed from the respective perspectives 702A, 706A, 708A, 710A of the participating users. This prevents the need to have business owners or executives travel to a common location to review physical mock stores. In this example, the VR environment is shared with three other devices, though it may be shared with more or fewer participants, via their own VR devices or shared VR devices, in other embodiments.

The central server may distribute the raw simulation data to the VR devices 702, 706-710 for rendering the virtual environment on the respective displays. In addition, one or more central servers of the VR platform may be included in the review simulation system for performing data collection, processing, and exporting. The central server may be a computer server or a system of interconnected computer servers, such as a web server, application server, application platform, virtual server, cloud data server, or other similar computing device having a central processing unit (CPU), microprocessor, or other suitable hardware. It should be understood that operations described as being performed by a single device may, unless otherwise clear from context, be performed collectively by multiple devices, which may form a distributed and/or virtual system. Thus, there could be several cooperating servers of homogenous or varying types, layers or other elements, processes or components, which may be chained or otherwise configured, which can interact to perform tasks such as obtaining data from an appropriate data store that is accessible locally to the central server or remotely over the network.

The central server may include any appropriate hardware, software and firmware for communicating with the data stores and VR devices as needed to execute aspects of one or more simulation applications for the VR devices, handling some or all of the data access and device logic for an application. The central server may include several modules for performing the processes described above for all connected VR devices, including without limitation: a data intake module for retrieving from the data stores any data needed to generate the simulation, and for processing such data according to the simulation application; a data export module for storing generated and modified data, such as storing simulation data in the simulation data store; a simulation generator for generating the raw simulation data as described above and transmitting the simulation data to the VR devices; a synchronization module for synchronizing simulation data among multiple VR devices presenting the same simulation; a speech recognition module for extracting commands and other information from audio input containing speech; and, a transaction processing module for creating and transmitting transaction data for transactions initiated in the simulation.

Additionally, the central server or another computing device may make the simulation data and other generated data available to other devices and in other services; this includes distributing the data in any form, or alternatively providing the external devices and services with access to one or more of the data stores. In some embodiments, an application programming interface (API) (e.g., a representational state transfer ("REST") API) may be configured to enable or facilitate access to the content by another computing device or system.

For example, one or more merchant systems may use the API to provide product data, asset data, sales and/or marketing data, user account and history data, store maps, generated simulations, and other data to the VR platform.

The central server typically will include an operating system that provides executable device logic for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

Viewers may view the three-dimensional product design such as the retail store layout via a display device, ideally a VR headset such as the example depicted in FIG. 1. Viewers may provide feedback, after viewing simulated environment, through the communication network. For example, one viewer may want to rearrange certain merchandise on a certain shelf in the retail store, or for certain aspects to be removed or replaced entirely. The viewer's feedback may be input to the viewer VR display device using a controller or other interface device such as a keyboard, and may be transmitted to the presenter VR device via the communication network. Additionally, or alternatively, this could include voice communication through microphones and speakers on or connected to the VR headset. Upon receipt of the feedback, the presenter may use a controller to make the suggested changes to the product design. After the changes are made by the presenter, the changes to the product design would be available on viewer VR display devices. The changed product design may be readily available as soon as the presenter makes the changes on the presenter VR device. The role of presenter and viewer may not be static. For example, the presenter may pass the presenter rights to a viewer, who then becomes the presenter and may be able to implement design changes.

Although the presenter may typically be assigned to one VR device 702 at a time, there may be situations where all viewers may serve as presenters and be able to change the product designs. The product design may be three-dimensional in general, however, the product design display and changes may be conducted when the design is shown as two-dimensional images outside of the VR specific device. As such, viewers and the presenter may also view the product designs as two-dimensional images and/or video at individual locations without affecting the display properties at other locations. Even though each VR device location may have equipment for the viewers and/or presenter to see the three-dimensional images and/or videos of the product design the viewers and/or the presenter may be able to select the two-dimensional views of the product design to view.

Two-dimensional images and/or videos may be viewed by reviewers in the same VR devices, or alternatively, viewers may view the three-dimensional images of product designs in a headset and may view the two-dimensional images in a separate device such as a television.

The VR platform is capable of displaying the simulated environment at different spatial scales, as illustrated in FIG. 8. Each viewer may pick a specific part of the simulated environment for viewing, or adjust the size of the image displayed in the viewer display device by moving the image and/or zooming in/out the image. Changes in image specifcity is independent across devices, thus, changing the view on one display device may not affect the view displayed on another viewer display device or the presenter display device. Referencing FIG. 8, three different views 802, 804, 806 are presented at different scale levels across three example display devices.

An identification token may be assigned for each of the viewers and the presenter who review the product designs. The identification token may be a number or a simplified image of each of viewers and the presenter who participate in the review simulation. The identification token may be displayed in the devices. The displayed identification token may not include the viewer or the presenter himself/herself for the device, and all identification tokens for other devices may be displayed. Or alternatively, all identification tokens may be displayed in all devices. In certain situations, the identification token may be avatars to represent each of viewers and the presenter. The avatars may be placed and incorporated in the simulated environment displayed in the devices. For example, avatars of viewers and presenter may be incorporated in the example retail store depicted in FIG. 5. The viewers and presenter may see and interact with the avatars of the others during the review simulation. The identification token may also be used to identify the feedback provided to the presenter and identify every change made during the review simulation.

Figure 9:
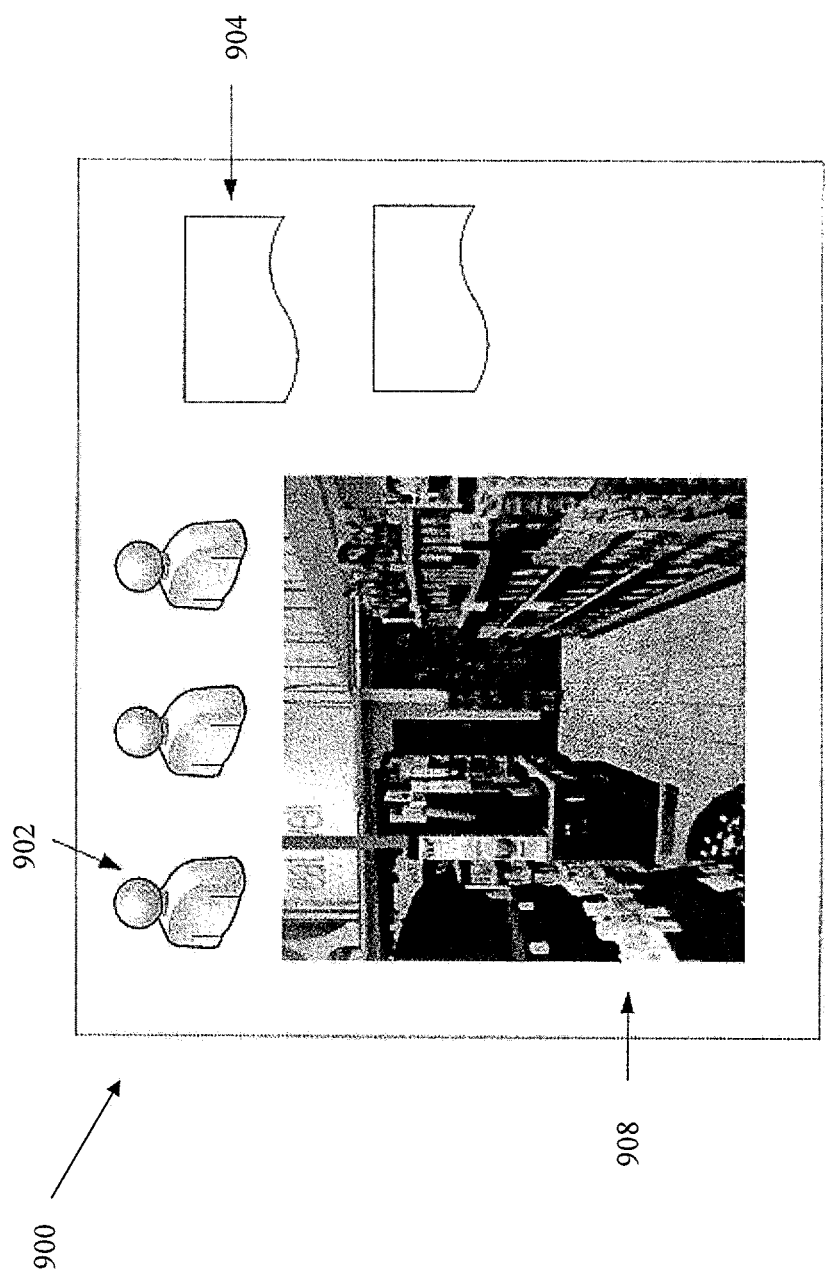
FIG. 9 is a diagram of an exemplary presenter VR terminal for a VR platform enabling simulation review.

FIG. 9 illustrates one example of a presenter VR device 900. As shown in FIG. 9, a retail store layout setting 908 is displayed in the presenter VR device. The retail store layout 908 may be either in the three-dimensional view or in the two-dimensional view. Using the presenter VR device 900, the presenter may be able to move within the virtual environment, such as by walking toward the simulated shelf objects displayed in the VR device. In one embodiment, the presenter may be able to use a controller to pick merchandise on the shelf, move it, and/or replace it with different merchandise while viewers observe these changes. Additionally or alternatively, the presenter and/or some or all of the reviewers may be enabled to add, delete, and/or manipulate layout objects and other simulated objects in order to change the simulated environment. The changes can be accepted, rejected, or modified by other users, as described herein, thus iterating the simulation data until the environment represents an optimized or target layout of the retail store.

Icons 902 represent identification tokens for others viewers that may be displayed in the presenter VR device 900. As shown in FIG. 9, icons 902 may be displayed outside the three-dimensional view 908. However, they may also be avatars of viewers and may be placed inside the three-dimensional view 908 within the virtual store simulation.

Documents 904 may also be apparent in the presenter VR device 900. As shown in FIG. 9, one or more documents 904 may be displayed as two-dimensional views outside the three-dimensional views 908 showing the retail store settings. The two-dimensional documents 904 and three-dimensional views 908 may be displayed in two separate devices. For example, the retail store may be displayed in a headset and the one or more two-dimensional documents 904 may be displayed in a separate monitor inside the room. However, the two-dimensional documents 904 and three-dimensional views 908 may al so be displayed in one integrated device. Such device may be a headset or a standalone television, or any other devices that may show the two-dimensional documents 904 and three-dimensional views 908 simultaneously.

In addition to designing and reviewing different aspects of retail stores, the VR platform also simulates the retail experience for customers in a similar manner. Using a headset or other acceptable device for displaying the VR environment, the customer would be presented with, for example in FIG. 5, the exemplary visual representation 500 of a retail environment generated by the present system.

The user of the VR device may be represented in the simulation as one or more avatars. The avatar may have programmable parameters that affect its perspective and movement within the store, as well as its appearance to other users as described below. For example, the user may set a height of the avatar, which causes the simulation generator to render the first-person view at the corresponding height within the scale store simulation. Position data analyzed by the simulation generator may change the view as well as the avatar's in-simulation appearance. For example, the user may crouch or stand tip-toe or turn his head, causing the positional tracking devices to generate new position data; accordingly, the simulation generator may raise or lower the relative height of the first-person view, or may rotate the displayed field of view. Other movements such as waving a hand or folding arms across the chest may also be detected and represented in the simulation, in some embodiments. The avatar may further have sub-avatars, such as "hand" avatars representing the hand-held controllers.

In some embodiments, the VR platform may be configured to display the simulation to multiple users simultaneously, and may further place the multiple users in the same simulation and enable the users to interact with each other. The avatar of a first user may thus be rendered visible to a second user when the first user's location in the store is within the second user's field of view. The avatar's parameters, as well as its position and orientation, its interaction with simulated objects, and other features, may be accurately represented in the simulation presented to a user looking at the avatar. In some embodiments, the various users may be enabled to select one or more of the visible characteristics of their respective avatars. In one embodiment, a user may select a preconfigured avatar from a plurality of templated avatars. In other embodiments, the VR platform may include or interface with a body scanning device that captures the physical characteristics of the user in real life and generates a model of the user's avatar that closely resembles the user himself. Similarly, the body scanning device or another scanning device may capture the user's facial appearance and map the captured face to the user's avatar. Three-dimensional computer graphics modeling techniques may be applied to create the appearance that a user is talking or making other facial expressions, or shifting his focus in a particular direction.

Visual indicators may also be presented in association with another user's avatar. For example, the user's name or other information identifying the avatar may be displayed, or a marker indicating special status of the user (e.g., the user is a presenter, or is the store owner, or is currently speaking) may be displayed. Additionally, in some embodiments the simulation generator may include computer-controlled avatars in the simulation. This can be used to, for example, place a "personal shopper" or a cashier in the store. User-controlled and/or computer-controlled avatars can exchange objects. In some embodiments, the simulation includes a user interface that enables the user to upload its own files or content into the simulation; such files/content may be associated with simulated objects and displayed in the simulation. Concurrent users of a simulation may also be able to hear each other using audio input and output interfaces of their respective VR devices; speech communications may be facilitated by the VR platform.

The users, via their avatars, may be able to interact with some or all of the assets in the simulation according to the parameters of the simulation and the asset. For example, as shown in the visual representation 400 of FIG. 4, a user may be able to use its hand avatar(s) 402 to pick up and inspect (e.g., rotate, and draw closely to the viewport to increase resolution) any product 404 on a shelf 406 in the simulated store, but the shelf 406 itself may be too heavy to lift, or may be marked as immovable in its interactivity parameters. Additional interactions that may involve other components of the VR platform, such as enabling the user to add or purchase assets, are described below.

Some embodiments of the VR platform may partially or fully address the problem of user motion sickness by providing simulation controls that manage the user's perception of movement. Typically, a three-dimensional (e.g., VR) simulation includes an environment that is translationally static with respect to the user, and the user's avatar and associated camera-like field of view move within the environment to generate different vantage points. In a VR simulation, the user may have to walk or perform other locomotive movements in real life, which are translated (e.g., via position sensors on the VR device) into movements of the avatar in the simulation. Additionally or alternatively, the VR platform may simulate user movement in the environment by moving and/or scaling the simulated environment around the user, while the user may remain static (i.e., standing still). This may attenuate or eliminate perceptive discordance between translational movements in the simulation and the lack or limitation of corresponding movements in the real world. The user may provide inputs, such as gestures, button presses, voice commands, and the like, to "move" throughout the simulated environment. The system may process the user inputs into corresponding positional changes of the user's avatar, and may update the presented simulation accordingly by translating the simulated environment in any of three spatial dimensions, rotating the simulated environment, and/or scaling the image projected to the user.

The simulation generator may analyze any suitable user input to change the properties of the simulation. Movements may be represented by position data and may update the user's location and orientation within the simulation; additionally, movements may cause collisions with simulated objects that need to be moved or modified in response. Inputs from the controllers, such as button or touchpad presses, may be associated with particular actions as is known in the art, and the simulation generator may analyze the effects of the actions and update the simulation accordingly. User interfaces for presenting information to a user may be optimized for VR devices as well. For example, on-screen or "heads-up" displays of information have been shown to interrupt the immersion into the simulation. Instead, the information may be provided via audio output to the user, or by rendering the information onto a simulated object that the user will realistically perceive to be part of the simulated environment.

For instance, under different interaction modes visible objects may be "highlighted" in the simulation so that the user knows they can be selected or interacted with. Interaction modes might include editing fixtures, where only fixtures in the simulation can be selected and rearranged. Other interaction modes might include, but are not limited to, product placement, aisle placement, VR environment presentation, or shared viewing; various examples of these interaction modes are described herein. The system may determine the interaction mode, which may be identified by metadata for the simulation and/or may be determined by a configurable setting that pertains to the simulation, to each user, or to certain groups of users. For example, the interaction mode may be associated with a user type, which in a review simulation may be "presenter" or "reviewer;" the interaction mode may be different between different types of users, determining any limitations on the associated users with respect to manipulating objects in the simulation. When rendering objects to the viewing perspectives of the VR devices associated with the various users, the system may determine the interaction mode for the corresponding user; if the user is able to select, manipulate, or otherwise interact with the object, the system may modify the visual representation to include highlighting, such as a brighter color, a different rendering of spectral data (e.g., reflection of simulated environment lighting), a special lighting feature of edges of the object (e.g., outlining the object with a bright-colored line in the viewing perspective), and the like.

When objects are created for simulation, whether inside or outside the simulation, the objects, or components (e.g., assets) thereof, may be "tagged," in that they may include information that the system processes to generate the object according to an associated object type (e.g., a fixture type, an asset type, etc.). These tags may apply or convey certain functionality when the corresponding object is simulated according to an interaction mode of the simulation. That is, different objects may be interactive in different modes based on how objects were created and what tags were applied. For example, a shelf module comprising a set number of shelves and a set length, height, and shelf spacing may be placed in the simulation, and may be manipulated when the simulation is in a "fixture editing" or "aisle placement" interaction mode, but not when the simulation is in a "product placement" mode. The system may place all users present in the simulation into the same interaction mode, or may coordinate different users into different interaction modes. In one example, the user having presenter status may be the only user in an interaction mode that allows manipulation of fixtures, such as shelf modules, freezer modules, aisles, checkout stands, lighting fixtures, etc., while all other users are placed in a "review" mode where they can only interact with each other and cannot change the VR environment, or can only manipulate placed products, and the like.

Other heads up displays may be provided to a particular user, a subset of users, or every user. Another example is a teleportation display that allows the user to navigate wide areas of virtual space while constrained to a smaller physical space. For example, the VR headset may display a virtual grid within the simulation to provide a cue to users that they may be near a physical boundary. During the simulation assembly, users may select another location within the virtual environment and be automatically transported there without moving through physical space. A preview of where they will be transported within the VR environment may be shown in the display to minimize the jarring effects of moving long distances, as well as providing the user with the option of confirming their new choice of location within the environment. During the simulation review, the VR environment may be shared with multiple users. Virtual cues may be placed within the environment by the presenter, for example, at points of interest as the presenter moves through space. These cues may be used as suggested teleportation locations for the reviewers, or as a marker along a pathway for the reviewers to follow. The simulation presenter may also use the cues to summon the reviewers using the teleportation feature. Presenters may choose locations throughout the environment to summon the reviewers. A preview of these locations may be shown to the reviewers, such as during the self-directed teleportation process to minimize motion sickness and confirm the teleportation. Similarly, typical user input devices such as keyboards and mice are difficult to use in VR simulations, and also disrupt the immersion of the user, so commands and data entry may be input by user speech.

The simulation generator may also track usage data with respect to users, assets, and/or locations (e.g., time spent in a room) within the simulation, and may generate, store, and analyze the usage data according to any desired application. Non-limiting examples of user movements or interactions that can generate corresponding usage data include: amount of time spent in a location, such as a room; amount of time spent with the field of view focused on a particular asset or on a particular heading (i.e., for performing visual attention analysis); amount of time spent carrying an asset; number of times interacting with (e.g., picking up) an asset; travel paths of avatars through the store; frequency of avatar collisions with an object (e.g., a shelf); purchase trends for products associated with assets; amount of time spent communicating with another avatar; and the like.

Generating a Customized Retail Simulation

Figure 10A:
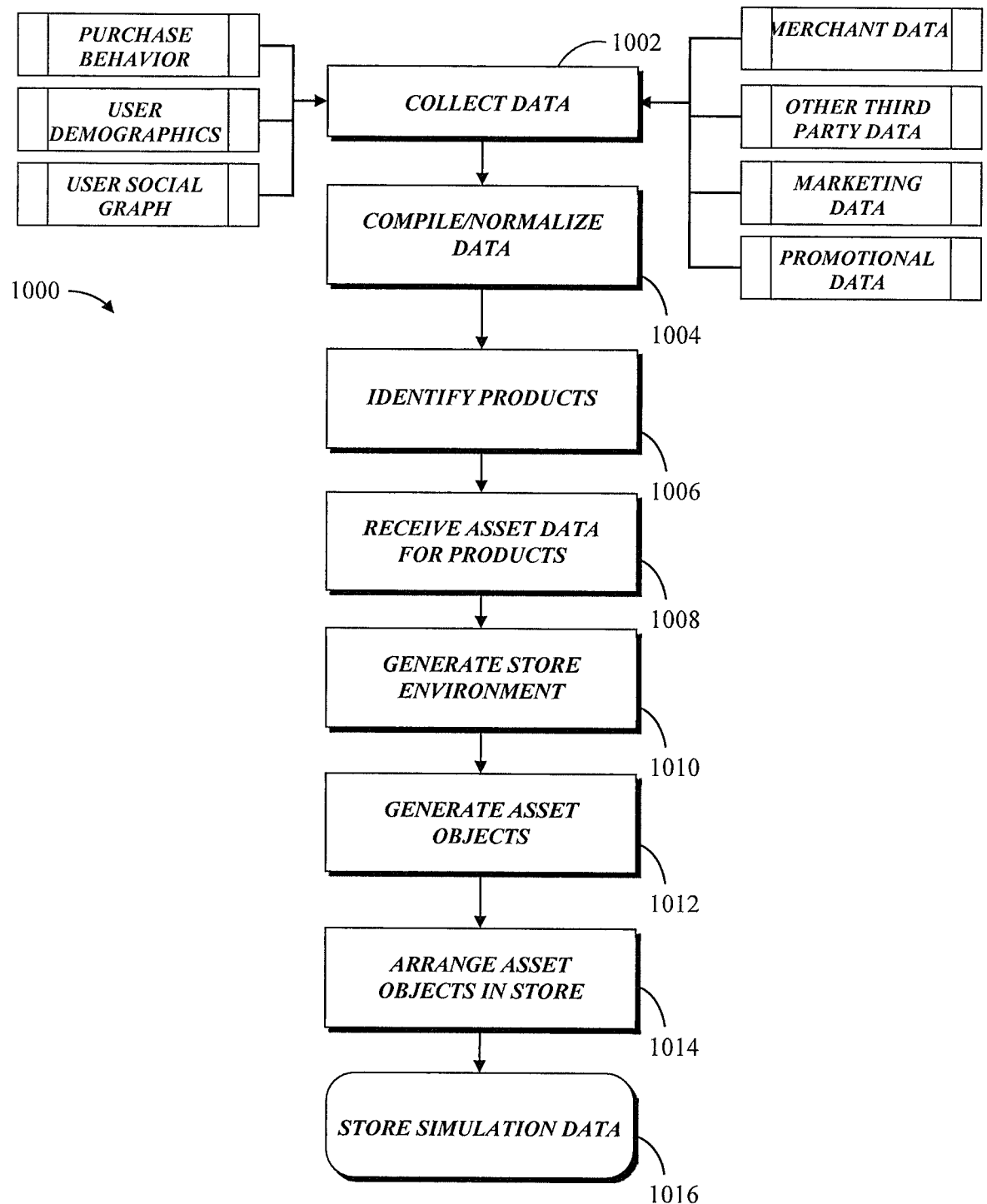
FIG. 10A is a flowchart showing a method of generating a customized store simulation for a user.

Implementations of the present VR platform may use the devices and simulator generation processes described above to generate a customized retail store simulation that is specific to purchasing trends and product interests of a particular user, and to present the simulation to the user on a VR device. In some embodiments, "customization" results in the display on simulated shelves and racks, in simulated display cases, etc., of simulated assets representing the relevant products. Thus, the products that the user, using the VR device, can see and interact with in, e.g., the visual representations of FIGS. 4-6, are selected for relevance to the user. FIG. 10A illustrates an exemplary method 1000 that may be executed by one or more computing devices, including the VR device, one or more servers, and other computing devices alone or in cooperation with each other, to generate a portion or the entirety of the customized retail store simulation. At step 1002, the device may collect any data needed to determine and describe the products to be displayed in the customized store. The data may be collected from one or more suitable sources, and may include data that is specific to the user, data that is specific to other users of the VR platform and/or of other associated services, and/or data that relevant to the products and is obtained from merchants, product marketing services, promotional data stores, and other third-party data sources.

Figure 10B:
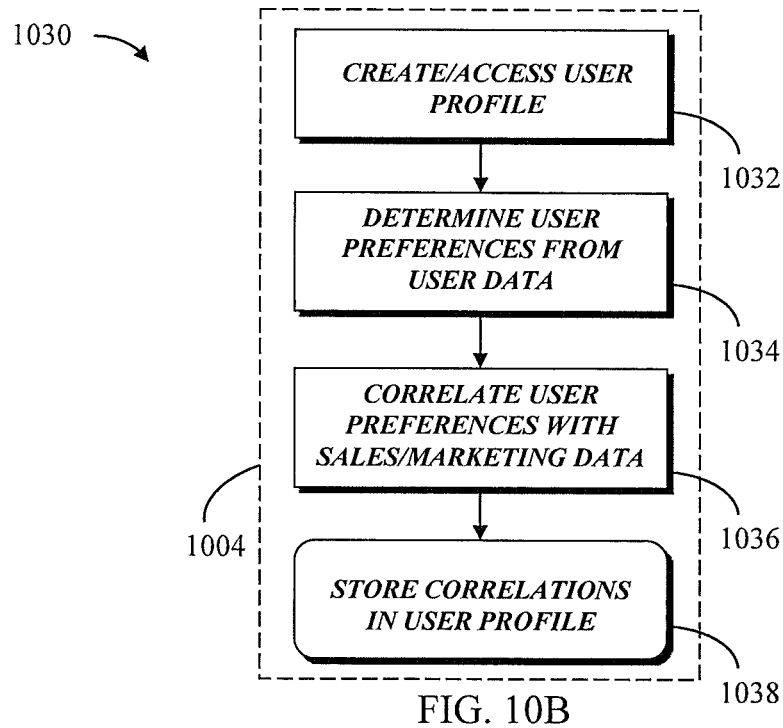
FIG. 10B is a flowchart of an exemplary method of compiling or normalizing data for generating the customized store.

At step 1004, the device may compile, normalize, and otherwise analyze the data in order to identify and/or quantify and/or qualify relationships between elements of the collected data; as a result, a profile of the user's product desires and preferences, shopping behaviors, and the like emerges, and the device may associate any products relevant to the information in the user profile with the user for potential display in the customized store. FIG. 10B illustrates an exemplary method 1030 of compiling the data as in step 1004. At step 1032, the device may create a user profile, or may access an existing user profile, if any. At step 1034, the device may determine the user preferences by modeling relationships between the collected data, which may include data already in the user profile if one was accessed. At step 1036, the device may correlate the user preferences and other information in the user profile with collected sales and marketing data for one or more products. At step 1038, the device may store these correlations in the user profile.

Figure 10C:
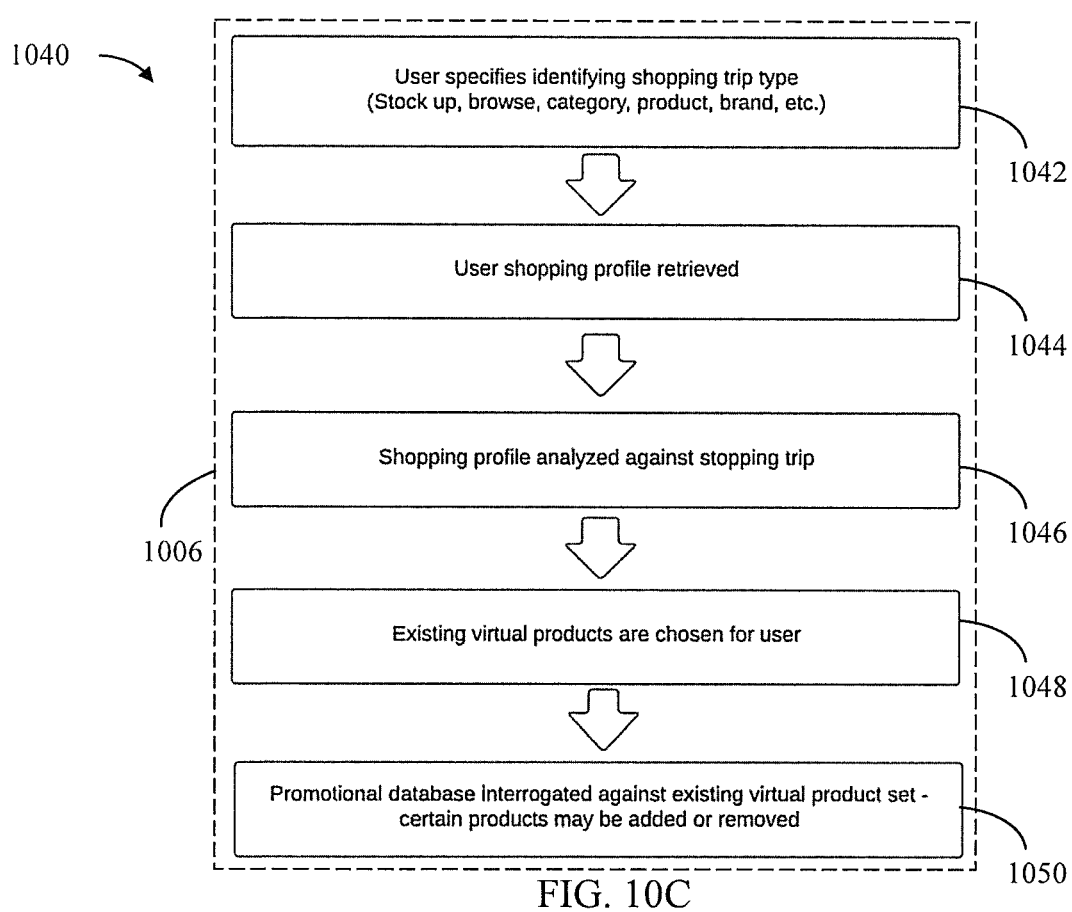
FIG. 10C is a flowchart of an exemplary method of identifying products for generating the customized store.

Returning to FIG. 10A, at step 1006 the device may identify products to display in the customized store simulation. The products may be identified from data relationships determined in step 1004, and further from real-time data collected during a simulation or another shopping transaction. FIG. 10C illustrates an exemplary method 1040 for identifying the products as in step 1006. At step 1042, the device may receive a user input or a user profile data element specifying a shopping trip type, which may determine parameters for products that are relevant to the user's current preferences. At step 1044, the device may create or retrieve a shopping profile, such as the user profile generated at step 1004 of FIG. 10A. At step 1046, the device may compare the shopping profile to the type of shopping trip, and at step 1048 the device may identify the products that are relevant to both the user and the type of shopping trip. At step 1050, the device may optionally compare the set of identified products to one or more data structures describing current product promotions in order to determine whether promotional products should be added to or removed from the set of identified products.

Returning to FIG. 10A, at step 1008 the device may receive asset data for the identified products. The asset data may include the visual data and other data needed to generate a visual representation of the product within the simulation. At step 1010, the device may generate the store environment 1010, such as by creating computer graphics objects (e.g. with respect to a provided or generated store map), program instructions, and other simulation parameters that model the space in which the user's avatar will be able to move and observe. At step 1012, the device may generate asset objects, which are the simulated objects that the user can see and interact with in the simulation, and which may include one or more instances of each of the identified products. At step 1014, the device may arrange the asset objects within the generated store environment, which completes the generated simulation. At step 1016, the device may store the simulation data in a data store and/or may present the simulation to the user via the VR device.

Figure 11A:
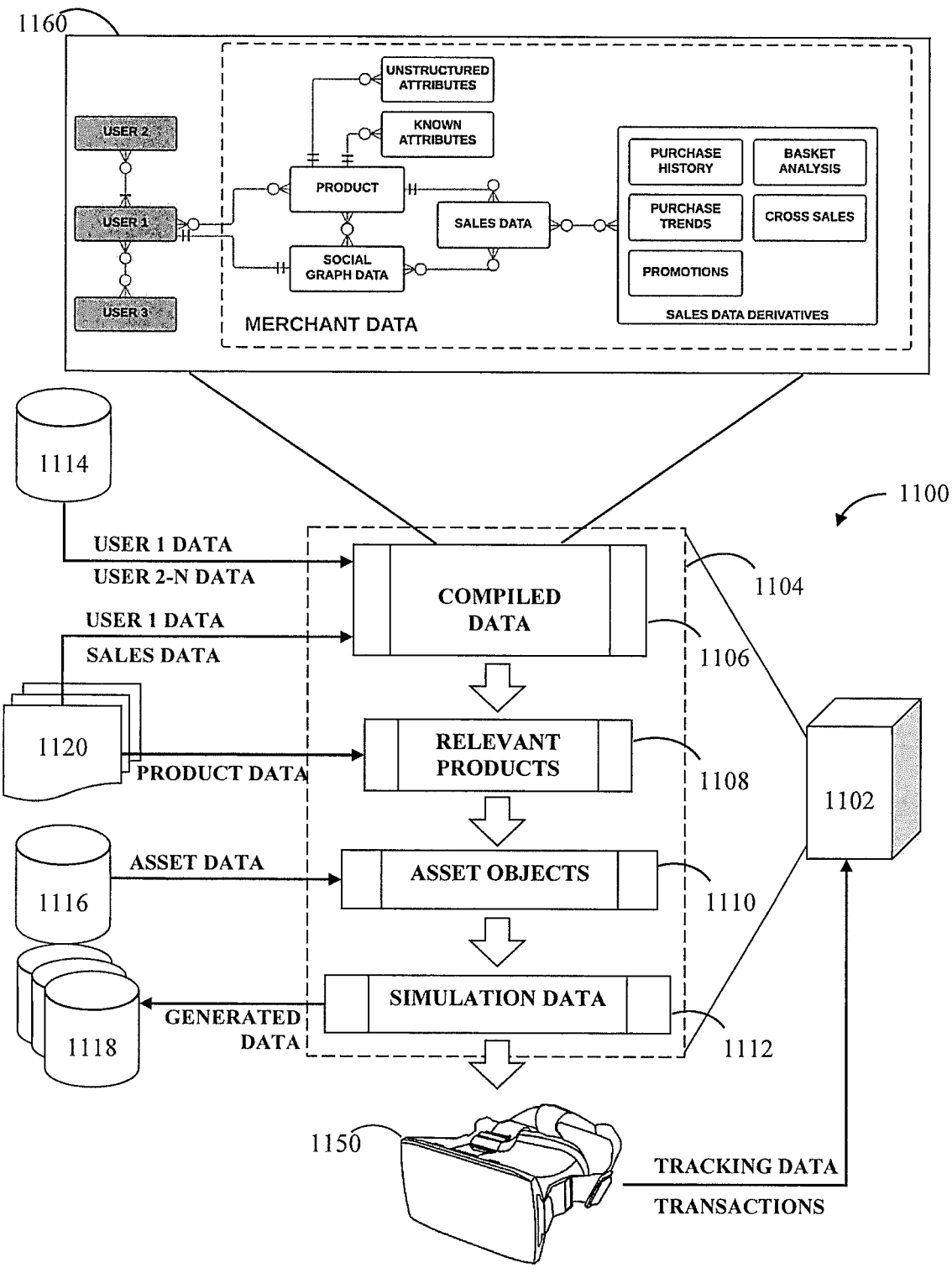
FIG. 11A is a diagram of an exemplary VR platform architecture for generating a simulation of a retail store that is customized for one or more users.

FIG. 11A illustrates an exemplary partial system architecture for a VR platform 1100 that generates the customized retail store simulation described above for display on a VR display device 1150 (e.g., a headset). A computing device 1102, which may be one device or a plurality of cooperating devices, generates the simulation data and delivers it to the VR display device 1150. In some embodiments, the computing device 1102 may be the computing device of the VR device that includes the VR display device 1150 (i.e., the computing device 1102 may be the computing device 140 and the VR display device 1150 may be the headset 102 of FIG. 1A). Additionally or alternatively, the computing device 1102 may be a remote server or other remote computing device as described further below. The data diagram 1104 illustrates intermediate data procedurally generated by the computing device 1102 during the generation of the simulation (e.g., while executing method 1000 of FIG. 10A). Compiling, normalizing, and otherwise analyzing user data of one or more users from a user data store 1114 with user data and/or sales data from one or more merchant systems 1120 may produce compiled data 1106. The compiled data 1106 may provide a basis for identifying relevant products by quantifying relationships between the data for users, sales, etc. For example, the data structure 1160 illustrates relationships between the user and data obtained from a merchant and/or other third parties that provide sales and promotional data.

Using the compiled data 1106 and potentially additional product data from the merchant systems 1120 or other systems, the computing device may determine the user-relevant products 1108. The computing device 1102 may use the relevant products 1108 to locate associated asset data in an asset data store 1116 and generate the asset objects 1110. The asset objects 1110 may be placed in the simulated environment to produce the simulation data 1112, which the computing device 1102 may deliver to the VR display device 1150 directly or via one or more other computing devices. The computing device 1102 receives feedback from the VR display device 1150 and/or VR device, the feedback representing the user's actions within the simulation. Exemplary feedback includes tracking data and/or transaction data as described above. Data generated during the simulation, including the simulation data 1112, modifications to stored simulation data, data recording user actions, purchase data, and the like, may be exported to one or more associated data stores 1118, which may include the user data store 1114, a data store for generated simulations, and other data stores described herein.

Figure 11B:
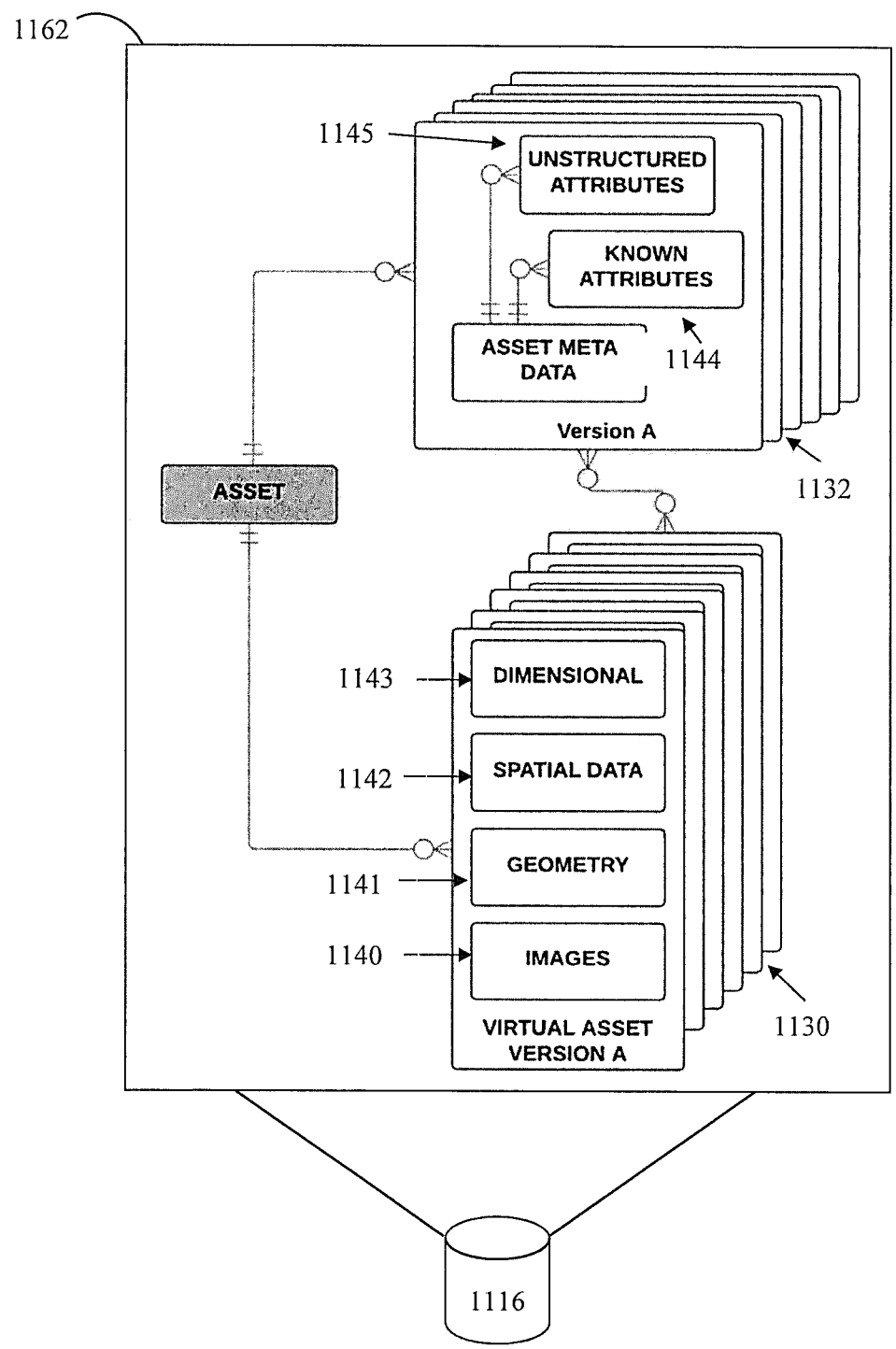
FIG. 11B is a diagram of a data structure for an asset used in the simulation of the retail store.

FIG. 11B illustrates an exemplary data structure 1162 of an asset in the asset data store 1116. An asset contains certain structural information that determines how it is displayed to the user. This includes, but is not limited to images 1140, geometry 1141, spatial data 1142, and asset dimensions 1143 representing the shape of the asset, as well as any asset rigging or animation data, and Level of Detail images. This information represents the structural part of the asset 1130. There is another set of asset meta data representing the intelligence of the asset 1132. This refers to known attributes 1144 like brand and category, as well as unstructured attributes 1145 that may be discovered or correlated from other data sources, marketing libraries, third parties, or users themselves. A complete picture of an asset contains all of these elements, both structural and intelligence.

Figure 12A:
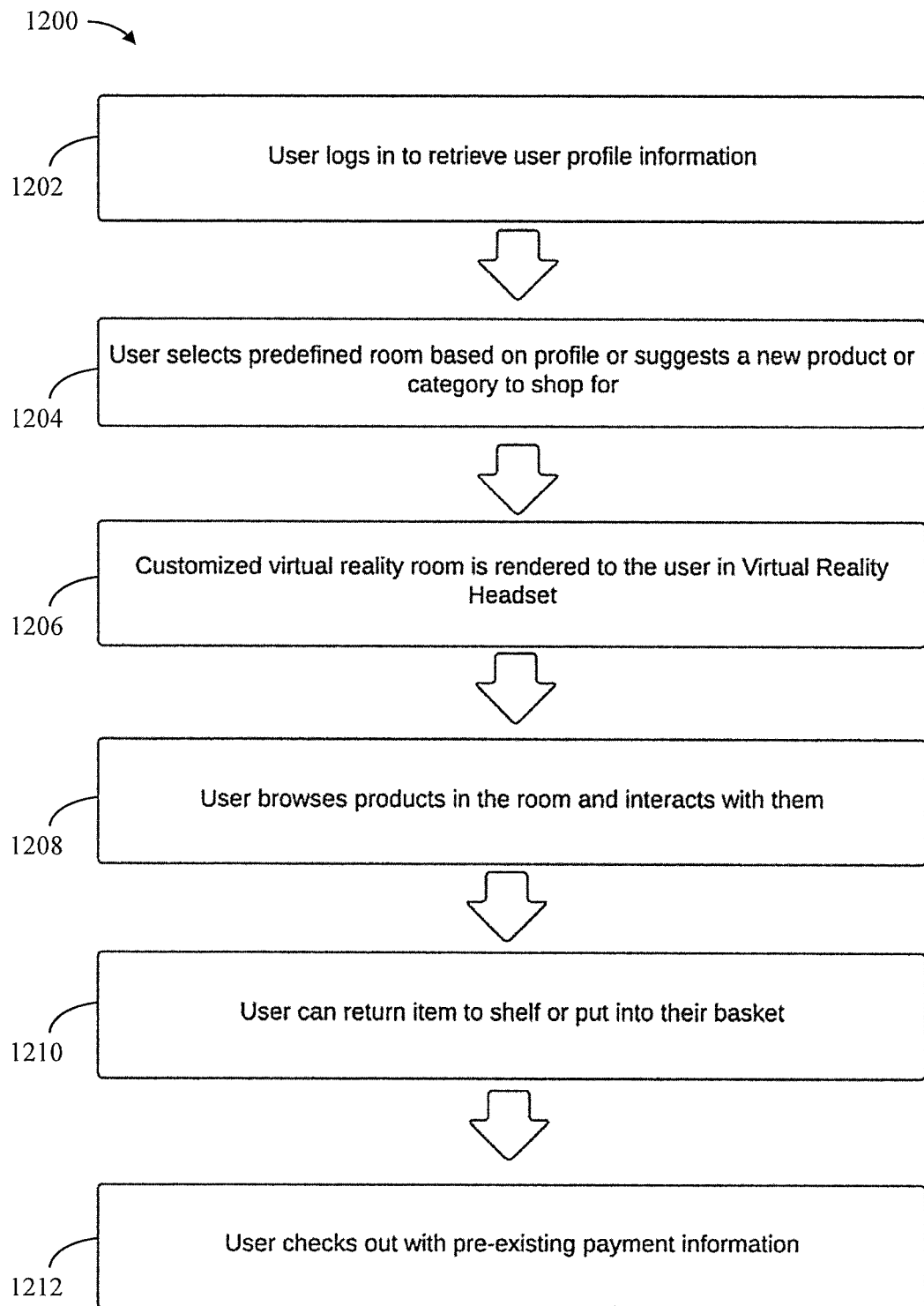
FIG. 12A is a flowchart showing a method of presenting a customized store simulation to a user.

The store generation methods such as method 1000 of FIG. 10A may be executed in advance of the user requesting access to the customized store simulation, so that the simulation data may be stored and then quickly retrieved for rendering to the VR device when requested. The simulation data may be updated periodically or upon an event (e.g., a new purchase using the user's account), so that the displayed products are coordinated with the user's current interests. Referring to FIG. 12A, when the user requests access to the customized store simulation, the VR device and/or one or more cooperating servers or other computing devices may execute a method 1200 of presenting the simulation to the user. The user logs in to the VR platform (step 1202) and, at step 1204, either selects a customized store or "room" that has already been generated or that can be generated from the user profile data, or selects a product or category that guides the generation of a new retail store simulation customized to the user's current shopping needs. At step 1206, the device renders the associated or generated customized store simulation to the VR device of the user, and the user views and interacts with the products represented in the simulation (step 1208). The user can pick up an item (i.e., an asset object) and either return it to the shelf or put it in the user's shopping basket (step 1210). When finished shopping, the user may execute a checkout process (step 1212), such as by going to a cash register in the simulated store.

Figure 12B:
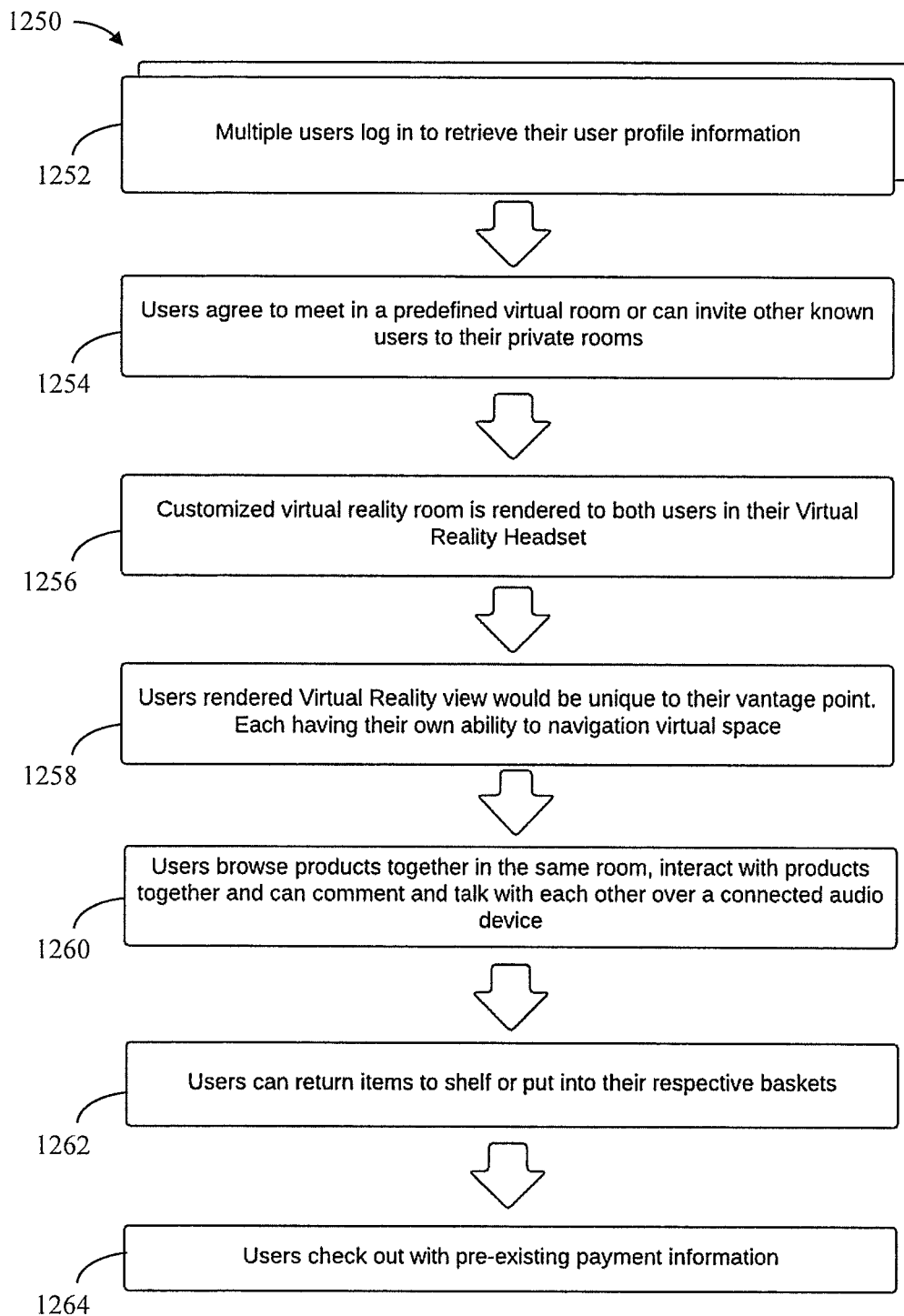
FIG. 12B is a flowchart showing a method of presenting a customized store simulation to multiple users.

FIG. 12B illustrates another method 1250 in which the simulation is presented to multiple users simultaneously. The users log in to the VR platform (step 1252) and, at step 1254, users agree to enter a customized store simulation together. At step 1256, the device renders the associated customized store simulation to the VR devices of each user as described above, and the users view the simulation each from their own vantage point (step 1258) and interact with the products and the other users represented in the simulation (step 1260). The users can pick up an item (i.e., an asset object) and either return it to the shelf or put it in the user's shopping basket (step 1262). When finished shopping, each user may execute a checkout process (step 1264), such as by going to a cash register in the simulated store.

VR Platform Architectures

Figure 13:
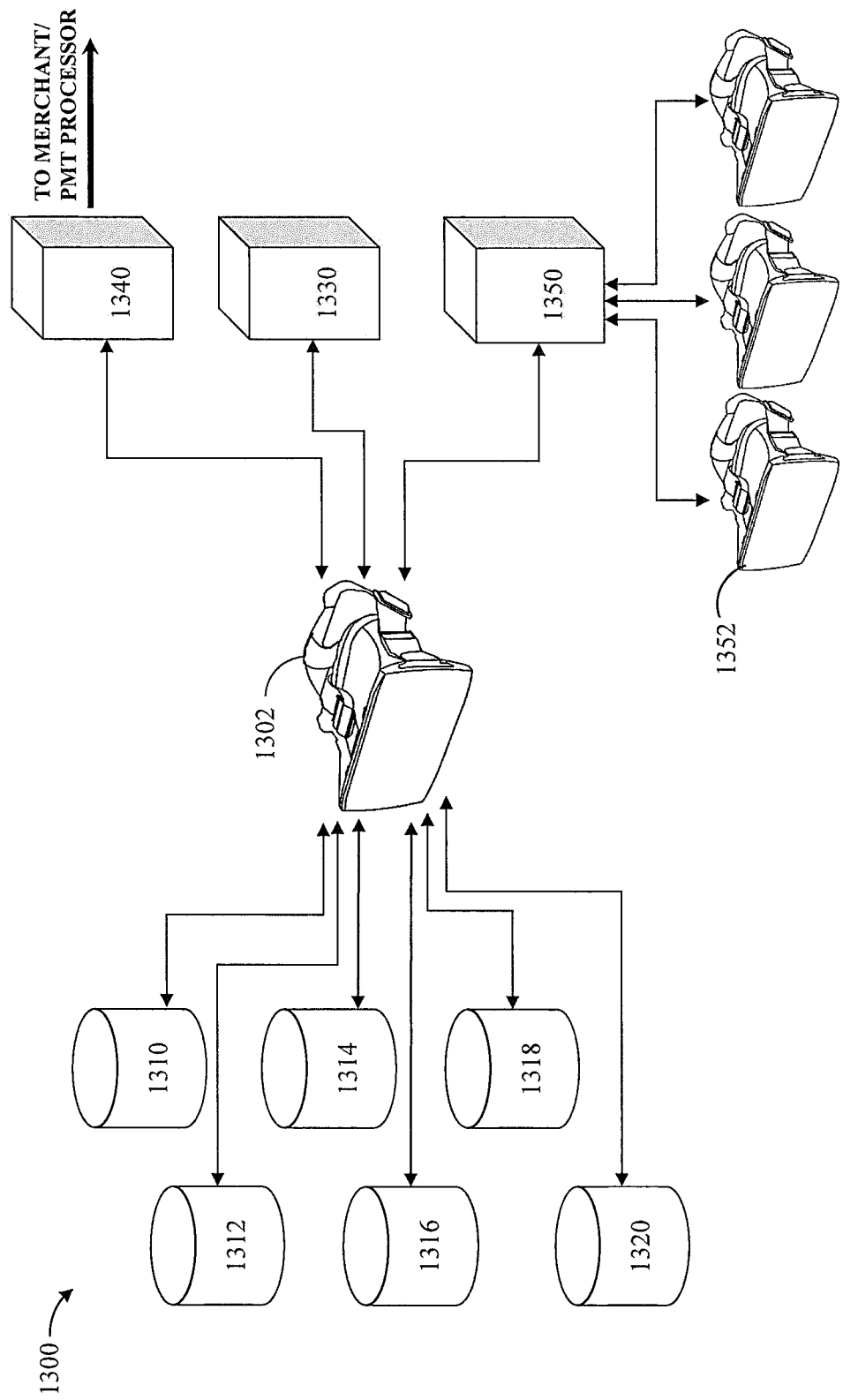
FIG. 13 is a diagram of an exemplary VR platform architecture in accordance with the present disclosure.
Figure 14:
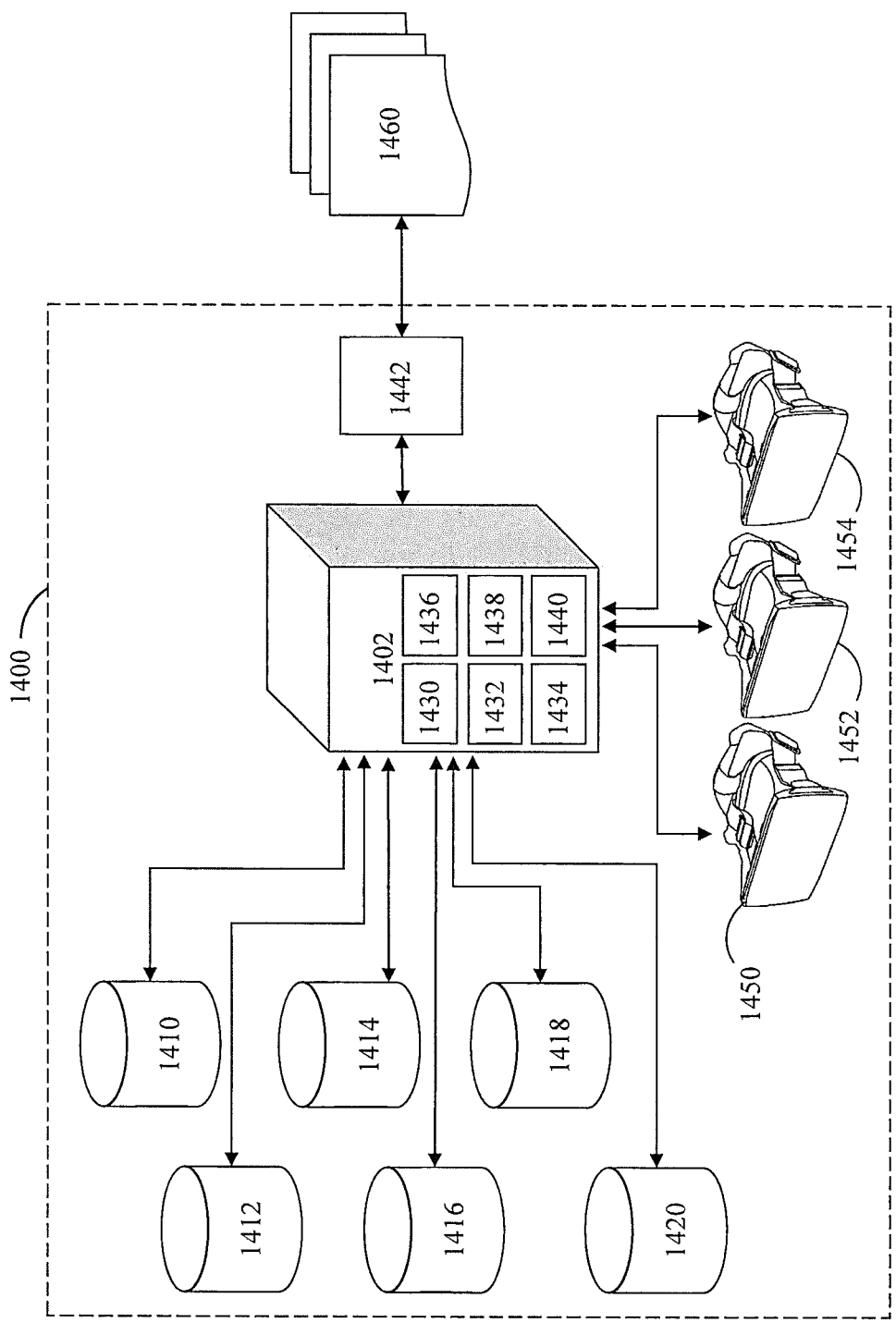
FIG. 14 is a diagram of another exemplary VR platform architecture in accordance with the present disclosure.

FIGS. 13 and 14 illustrate exemplary general system architectures for implementing the presently described VR platforms. Referring to FIG. 13, a VR platform 1300 may include a "standalone" VR device 1302 (e.g. the VR devices 100 of FIGS. 1A-B and 200 of FIG. 2) that performs the data retrieval and exporting and simulation generation processes described above. The data retrieved, analyzed, generated, exported, etc., may be stored in one or more data stores accessible by the VR device 1302. Generally as used herein, a data store may be any repository of information that is or can be made freely or securely accessible by the VR device 1302. Suitable data stores include, without limitation: databases or database systems, which may be a local database, online database, desktop database, server-side database, relational database, hierarchical database, network database, object database, object-relational database, associative database, concept-oriented database, entity-attribute-value database, multi-dimensional database, semi-structured database, star schema database, XML or JSON data object database, file, collection of files, spreadsheet, or other means of data storage located on a computer, client, server, or any other storage device known in the art or developed in the future; file systems; and electronic files such as web pages, spreadsheets, and documents. Each of the data stores may be temporary or permanently implemented.

Data stores in the platform 1300 may include specific information used in particular VR device 1302 operations. More specifically, the data stores can include several separate data tables, databases, data documents, dynamic data storage schemes and/or other data storage mechanisms and media for storing data relating to a particular aspect of the present disclosure, including without limitation the data structures and user interface data described herein. It should be understood that there can be many aspects that may need to be stored in the data stores, such as user information, access rights information, and merchant-proprietary data, which can be stored in any appropriate mechanisms in the data stores. The data stores may be operable, through logic associated therewith, to receive instructions from the VR device 1302 and obtain, update, or otherwise process data in response thereto. The VR device 1302 may provide static, dynamic or a combination of static and dynamic data in response to the received instructions. Dynamic data, such as data used in web logs (blogs), web or mobile applications and application interfaces, e-commerce websites and interfaces, point-of-sale data generation systems, news services and other applications may be generated by server-side structured languages as described or may be provided by the VR device 1302, other VR devices 1352 in the VR platform 1300, merchant data systems, purchase data aggregation systems, transaction processing systems, and other systems.

The VR platform 1300 may include a map data store 1310 that stores data representing store maps. The VR device 1302 may retrieve a store map from the map data store 1310 in order to generate an environmental simulation based on the store map. The VR device 1302 may also store new or altered store maps in the map data store 1310. The VR platform 1300 may include an asset data store 1312 that stores data and metadata pertaining to assets that can be simulated as described above. The VR device 1302 may access the asset data store 1312 to search for appropriate assets and retrieve them for integration into the simulation.

The VR platform 1300 may include a user data store 1314 that maintains data specific to particular users of the VR device 1302. Such user data may include identifying information, personal and/or professional details as described above, and login or other authorization information for accessing the user's accounts with various merchants, social networking services, and other systems. Such data may further include raw or processed historical data representing the user's past purchases, usage of the VR device 1302, communications with other users, and other traceable activity that may be useful in generating the simulation. Additionally, the user data may include user-supplied preferences relating to the presentation of the simulation to the user, and/or to specific assets, assets of particular types, or assets with particular characteristics that the VR device 1302 should evaluate for inclusion in the simulation. The VR device 1302 may access the user data store 1314 under authority granted by the user, and may retrieve and operate on user data as described above.

The VR platform 1300 may include one or more sales data stores 1316 containing sales data for products that are or may be associated with assets for the simulation. Sales data may be provided by one or more merchants, or by a data aggregation system, or may be obtained by the VR platform 1300 by other means. The sales data may be used by the VR device 1302 to identify trends, associate purchasing information with other information like product placement and user engagement, and perform other processing related to generating the simulation as described above. Relatedly, the VR platform 1300 may include one or more marketing data stores 1318 that contain additional aggregated information describing marketing efforts, market penetration, and other performance information related to particular products. The marketing data may include information regarding product, category or brand promotional strategies or strategy history and effectiveness. The marketing data store may be updated from time to time as the effectiveness is measured against actual shopping behavior and results so as to become more effective.

The VR platform 1300 may also include a simulation data store 1320 that stores information about simulations the VR device 1302 has already generated. Such previously generated simulation data may be used in any manner described herein, such as to perform iterations of the retail store environment design that may be compared against each other to determine an optimized layout for the physical retail store. The VR device 1302 may store generated simulations in the simulation data store 1320 and retrieve them as needed.

The VR platform 1300 may also include one or more computing devices, such as servers, that are remote from the VR device 1302 and cooperate with the VR device 1302 to perform certain functions. In particular, each computing device may include one or more processors and device logic that, when executed by the processor(s), configures the computing device to perform the desired operations. In one embodiment, the VR platform 1300 may include a speech recognition server 1330 for recognizing speech in an audio file transmitted by the VR device 1302 and exporting back to the VR device 1302 a translation of the speech into an operable format, such as text or known program instructions (i.e., commands). In one embodiment, the VR platform 1300 may include a transaction server 1340 for facilitating purchases and other transactions initiated by user action within the simulation. The VR device 1302 may transmit transaction data describing the desired transaction to the transaction server 1340, and the transaction server 1340 may interact with other systems, such as merchant inventory systems and payment processing systems, to execute the transaction or identify errors in the transaction. The VR platform 1300 may also include a synchronization server 1350 that maintains synchronous simulation data between the VR device 1302 and other VR devices 1352 operating on the same simulation.

Referring to FIG. 14, a distributed VR platform 1400 may include one or more central servers 1402 that perform the data collection, processing, and exporting, and further generate the raw simulation data. The central server 1402 then distributes the raw simulation data to the VR devices 1450, 1452, 1454 for rendering to the respective displays. The central server 1402 may be a server computer or a system of interconnected server computers, such as a web server, application server, application platform, virtual server, cloud data server, and the like, a personal computer, laptop computer, tablet computer, e-reader, smartphone, personal data assistant, set-top box, digital media player, microconsole, home automation system, or similar computing device having a central processing unit (CPU), microprocessor, or other suitable processor. It should be understood that operations described as being performed by a single device may, unless otherwise clear from context, be performed collectively by multiple devices, which may form a distributed and/or virtual system. Thus, there could be several cooperating servers 1402 of homogenous or varying types, layers or other elements, processes or components, which may be chained or otherwise configured, which can interact to perform tasks such as obtaining data from an appropriate data store that is accessible locally to the central server 1402 or remotely over the network. In particular, the VR platform 1400 may include, and the central sever 1402 may access, one or more of a map data store 1410, an asset data store 1412, a user data store 1414, a sales data store 1416, a marketing data store 1418, and a simulation data store 1420 as described above with respect to data stores 1310-1320 of FIG. 13.

The central server 1402 can include any appropriate hardware, software and firmware for communicating with the data stores 1410-1420 and VR devices 1450-1454 as needed to execute aspects of one or more simulation applications for the VR devices 1450-1454, handling some or all of the data access and device logic for an application. The central server 1402 may include several modules for performing the processes described above, including without limitation: a data intake module 1430 for retrieving from the data stores 1410-1420 any data needed to generate the simulation, and for processing such data according to the simulation application; a data export module 1432 for storing generated and modified data, such as storing simulation data in the simulation data store 1420; a simulation generator 1434 for generating the raw simulation data as described above and transmitting the simulation data to the VR devices 1450-1454; a synchronization module 1436 for synchronizing simulation data among multiple VR devices 1450-1454 presenting the same simulation; a speech recognition module 1438 for extracting commands and other information from audio input containing speech; and, a transaction processing module 1440 for creating and transmitting transaction data for transactions initiated in the simulation.

Additionally, the central server 1402 or another computing device can make the simulation data and other generated data available to other devices and in other services; this includes distributing the data in any form, or alternatively providing the external devices and services with access to one or more of the data stores 1410-1420. In some embodiments, an application programming interface (API) 1442 (e.g., a representational state transfer ("REST") API) may be configured to enable or facilitate access to the content by another computing device or system. For example, one or more merchant systems 1460 may use the API to provide product data, asset data, sales and/or marketing data, user account and history data, store maps, generated simulations, and other data to the VR platform 1400.

The central server 1402 typically will include an operating system that provides executable device logic for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure. The environment, in one embodiment, is a distributed and/or virtual computing environment utilizing several computer systems and components that are interconnected via communication links, using one or more computer networks or direct connections.

The present invention has been described in terms of one or more preferred embodiments, and it should be appreciated that many equivalents, alternatives, variations, and modifications, aside from those expressly stated, are possible and within the scope of the invention.

What is claimed is:

1. A system for generating a virtual reality (VR) simulation of a retail store, the device comprising a plurality of electronic data stores and one or more hardware computing devices in communication with the plurality of electronic data stores and with an immersive first VR display device that transforms simulation data into the VR simulation and presents the VR simulation to a user of the first VR display device such that the user perceives a retail store environment representing the retail store at a human scale, the one or more hardware computing devices executing computer-implemented instructions that upon execution cause the one or more hardware computing devices to:

receive, from one or more of the plurality of electronic data stores:
asset data associated with a plurality of products and a plurality of layout objects configured to display one or more of the plurality of products; and
a store plan for the retail store, the store plan comprising at least a store map and a layout, with respect to the store map, of the plurality of layout objects;

obtain, based on the asset data, a plurality of layout object models each comprising a 3D computer graphic model of one of the plurality of layout objects;

generate, based on the store plan, the simulation data, wherein the simulation data comprises a simulated store environment including the plurality of layout object models and configured to display visual representations of the plurality of products, wherein generating the simulation data includes:
determine that the store plan describes an arrangement of the plurality of products for display in relation to the plurality of layout object models;
obtain, based on the asset data, one or more asset objects each comprising a 3D computer graphic model of one of the one or more selected products; and
insert the one or more asset objects into the simulated store environment in accordance with the store plan; and send the simulation data to the first VR display device.

2. The system of claim 1, wherein to obtain the one or more asset objects, the one or more hardware computing devices further execute the instructions to cause the one or more hardware computing devices to:
identify, in the asset data associated with a first selected product of the one or more selected products, packaging data for the first selected product, the packaging data including a package type, a set of dimensions, and one or more images representing each viewable side of the corresponding 3D computer graphic model of the first selected product;
generate a blank 3D model having a shape identified by the package type;
scale the blank 3D model according to the set of dimensions to produce a scaled 3D model; render the one or more images onto the scaled 3D model to produce the corresponding 3D computer graphic model of the first selected product; and
create a first asset object of the one or more asset objects, the first asset object including the corresponding 3D computer graphic model of the first selected product and an asset identifier used by the first VR display device to enable interactions by the user with the first asset object within the VR simulation.

3. The system of claim 1, wherein one of the plurality of data stores is a user data store comprising user data identifying a first user of the system and describing one or more attributes of the first user, the one or more hardware devices are further in communication with a plurality of external data stores, and the one or more hardware computing devices further execute the instructions to cause the one or more hardware computing devices to:
receive the user data from the user data store;
obtain, from one or more of the plurality of external data stores using the user data, purchasing data describing one or more of:
previous sales of the plurality of products;
purchases by the first user of one or more of the plurality of products; purchasing behavior of other users of the system having the one or more attributes; and
marketing information for one or more of the plurality of products; identify one or more relationships between the user data and the purchasing data to produce a user profile associated with the first user and describing one or more shopping preferences of the user;

determine, from the plurality of products and based at least on the user profile, a plurality of preferred products that are relevant to the one or more shopping preferences; and create the arrangement to include display of the plurality of preferred products.

4. The system of claim 3, wherein the one or more hardware computing devices further execute the instructions to cause the one or more hardware computing devices to:

cause the first VR display device to generate first usage data describing each interaction in the VR simulation of the first user with a first asset object of the one or more asset objects, the first usage data including one or more of: a number of times the first user interacted with the first asset object; an amount of time spent by the first VR display device displaying a field of view including the first asset object; and, information indicating that the first user initiated a purchase of one or more of the preferred products by interacting with the first asset object;

receive the first usage data; and integrate the first usage data with the user profile.

5. The system of claim 1, wherein the one or more hardware computing devices further execute the instructions to cause the one or more hardware computing devices to:

send the simulation data to an immersive second VR display device in communication with the one or more hardware computing devices;

cause the first VR display device and the second VR display device to display the VR simulation of the simulation data as a synchronized simulation wherein a first user of the first VR display device and a second user of the second VR display device experience the same retail store environment;

receive, from one or both of the first VR display device and the second VR display device, feedback data describing one or more user interactions with the VR simulation;

determine that the feedback data describes one or more modifications to one or both of the layout of the plurality of layout objects and the arrangement of the one or more asset objects; and modify the store plan to reflect the one or more modifications.

6. The system of claim 5, wherein the one or more hardware computing devices further execute the instructions to cause the one or more hardware computing devices to, before modifying the store plan, determine that the feedback data comprises an indication that the one or more modifications are approved by the first user and the second user.

7. The system of claim 5, wherein the one or more hardware computing devices further execute the instructions to cause the one or more hardware computing devices to:

obtain, from the plurality of electronic data stores, user data associated with the first user and the second user;

determine that the user data identifies the first user as a presenter and the second user as a viewer; and before modifying the store plan, determine that the feedback data comprises a first indication that interactions of the second user generated the one or more modifications, and a second indication that the one or more modifications are approved by the first user.

8. The system of claim 5, wherein the one or more hardware computing devices further execute the instructions to cause the one or more hardware computing devices to:

send the simulation data to a third display device in communication with the one or more hardware computing devices;

cause the third display device to display the VR simulation of the simulation data together with the first VR display device and the second VR display device as the synchronized simulation; generate a plurality of identification tokens each comprising a user identifier and a user graphical representation, each identification token of the plurality of identification tokens being associated with a corresponding user of a plurality of users including the first user, the second user, and the third user;

determine that the first user is using the first VR display device and the second user is using the second VR display device;

send, of the plurality of identification tokens to the third display device, a first token identifying the first user and a second token identifying the second user; and cause the third display device to display, together with the VR simulation, an interface indicating that the first user and the second user are active in the synchronized simulation, and including the corresponding graphical representations of the first token and the second token.

9. The system of claim 5, wherein the one or more hardware computing devices further execute the instructions to cause the one or more hardware computing devices to:

determine that the first user is accessing the system via the first VR display device and the second user is accessing the system via the second VR display device; and before sending the simulation data to the first VR display device and the second VR display device:

generate a first avatar object visually representing the first user;

generate a second avatar object visually representing the second user; and insert the first avatar object and the second avatar object into the simulation data to enable the first user and the second user to see each other in the synchronized simulation.

10. The system of claim 1, wherein the one or more hardware computing devices further execute the instructions to cause the one or more hardware computing devices to:

generate a user interface object enabling the user to select any of the plurality of products to be visually represented in the retail store environment;

insert the user interface object into the simulated environment to generate the simulation data;

during presentation by the first VR display device of the VR simulation to a first user of the VR display device:

cause the first VR display device to activate the user interface object in response to a first user input requesting the activation;

receive a second user input from the first VR display device;

determine that the second user input includes a selection, by the first user using the user interface object, of a first product of the plurality of products;

obtain, based on the asset data associated with the first product, a first asset object comprising a 3D computer graphic model of the first product;

send the first asset object to the first VR display device;

cause the first VR display device to include the first asset object in the VR simulation and to enable the first user to position the first asset object for display on a first layout object of the plurality of layout objects;

receive a third user input from the first VR display device;

determine that the third user input identifies a position of the first asset object with respect to the first layout object; and update the store plan to indicate that the first layout object displays one or more instances of the first product at the position.

11. The system of claim 1, wherein the plurality of electronic data stores store a plurality of speech tags each describing a corresponding voice command of a plurality of voice commands, and wherein the one or more hardware computing devices further execute the instructions to cause the one or more hardware computing devices to:
receive a user input from the first VR display device;
determine that the user input comprises speech of the first user;
determine that the speech identifies a search command of the plurality of voice commands, and further identifies one or more search terms;
determine that the one or more search terms identify a first product type of a plurality of product types associated with the plurality of products;
identify, from the plurality of products, a plurality of selected products having the first product type;
obtain, based on the asset data associated with the plurality of selected products, a plurality of asset objects each comprising a 3D computer graphic model of one of the plurality of selected products; and
send the plurality of asset objects to the first VR display device.

12. The system of claim 1, wherein the asset data is further associated with a plurality of marketing objects describing signage of the retail store, and wherein to generate the simulation data, the one or more hardware computing devices further execute the instructions to cause the one or more hardware computing devices to:
obtain, using the asset data, graphical models of the plurality of products and the plurality of marketing objects; and
insert the graphical models into the simulated store environment based on the store plan, such that the VR simulation presents the retail store environment to the first user as an assembled store environment capable of replacing a physical mock store simulating the retail store.

13. The system of claim 1, wherein the one or more hardware computing devices further execute the instructions to cause the one or more hardware computing devices to:
receive a user input indicating a selection of a first perspective or a second perspective; and responsive to the user input, causing the first VR display device to display, based on the selection, the VR simulation from the first perspective or the second perspective, wherein:
the first perspective comprises a field of view of the retail store environment at the human scale, wherein the first user is enabled to move the field of view throughout the retail store environment at a first-person perspective; and
the second perspective comprises a model view of the retail store environment, in which the entire simulated store environment, representing the store plan, is shown from above.

* * * * *